US008406961B2

(12) United States Patent
Pathak et al.

(10) Patent No.: US 8,406,961 B2
(45) Date of Patent: Mar. 26, 2013

(54) RECONFIGURABLE VEHICLE USER INTERFACE SYSTEM

(75) Inventors: Rabindra Pathak, San Jose, CA (US);
Peter Veprek, Los Gatos, CA (US);
Kem Gallione, Santa Cruz, CA (US);
Tsuyoshi Tanaka, Kyoto (JP)

(73) Assignee: Panasonic Corporation, Osaka (JP)

( * ) Notice: Subject to any disclaimer, the term of this patent is extended or adjusted under 35 U.S.C. 154(b) by 643 days.

(21) Appl. No.: 12/617,987

(22) Filed: Nov. 13, 2009

(65) Prior Publication Data

US 2010/0268426 A1 Oct. 21, 2010

Related U.S. Application Data

(60) Provisional application No. 61/169,833, filed on Apr. 16, 2009.

(51) Int. Cl.
*B60R 22/00* (2006.01)

(52) U.S. Cl. ........... 701/48; 701/41; 701/49; 701/36; 701/46; 340/461; 340/438; 340/971; 715/700; 715/863; 715/847

(58) Field of Classification Search ............ 701/36
See application file for complete search history.

(56) References Cited

U.S. PATENT DOCUMENTS

| | | | |
|---|---|---|---|
| 4,792,783 A | 12/1988 | Burgess et al. | |
| 6,377,860 B1* | 4/2002 | Gray et al. | 700/83 |
| 6,731,925 B2 | 5/2004 | Naboulsi | |
| 6,819,990 B2* | 11/2004 | Ichinose | 701/36 |
| 7,069,202 B2 | 6/2006 | Stewart et al. | |
| 7,126,583 B1 | 10/2006 | Breed | |
| 7,269,484 B2 | 9/2007 | Hein | |
| 7,295,904 B2 | 11/2007 | Kanevsky et al. | |
| 7,683,771 B1* | 3/2010 | Loeb | 340/461 |
| 2003/0096593 A1 | 5/2003 | Naboulsi | |
| 2003/0096594 A1 | 5/2003 | Naboulsi | |
| 2004/0107072 A1* | 6/2004 | Dietrich et al. | 702/153 |
| 2004/0209594 A1 | 10/2004 | Naboulsi | |
| 2006/0047386 A1* | 3/2006 | Kanevsky et al. | 701/36 |
| 2006/0227065 A1 | 10/2006 | Yukawa et al. | |
| 2006/0262103 A1 | 11/2006 | Hu et al. | |
| 2007/0149284 A1 | 6/2007 | Plavetich et al. | |
| 2007/0174393 A1* | 7/2007 | Bosschaert et al. | 709/206 |
| 2009/0189373 A1* | 7/2009 | Schramm et al. | 280/731 |
| 2010/0268426 A1* | 10/2010 | Pathak et al. | 701/48 |

* cited by examiner

*Primary Examiner* — Redhwan K Mawari
(74) *Attorney, Agent, or Firm* — Harness, Dickey & Pierce, P.L.C.

(57) ABSTRACT

A reconfigurable vehicle user interface system is presented. A vehicle user interface has a touch sensitive input devices such as touchpads and a touch screen that have specific function commands mapped to them. A user can select which function commands are mapped to which portions of the touch screen. This allows a user to customize the steering wheel function commands.

11 Claims, 52 Drawing Sheets

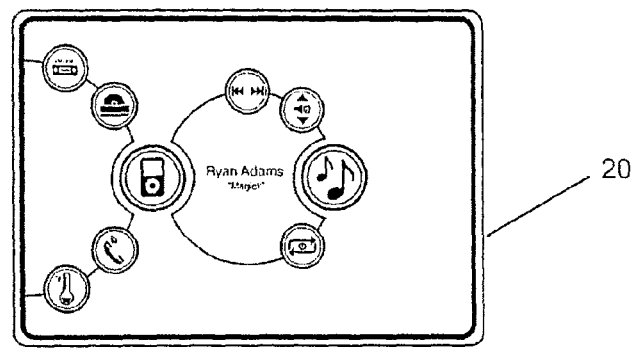
To go backwards in the UI the user touches the blue touchpad.
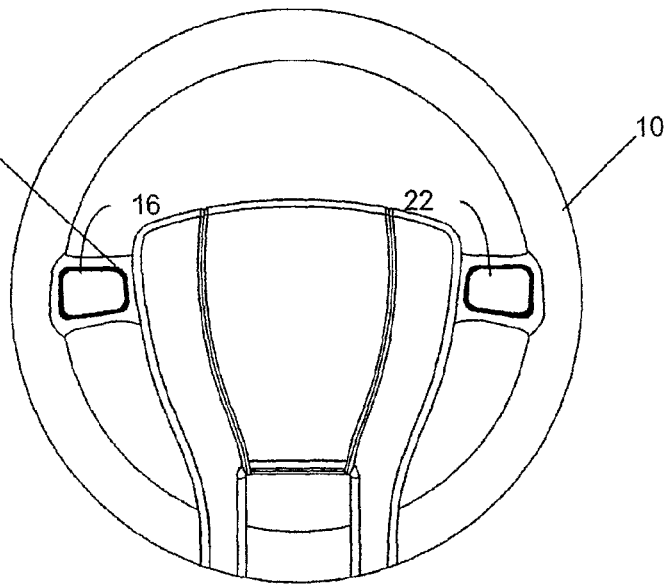
FIG 7K

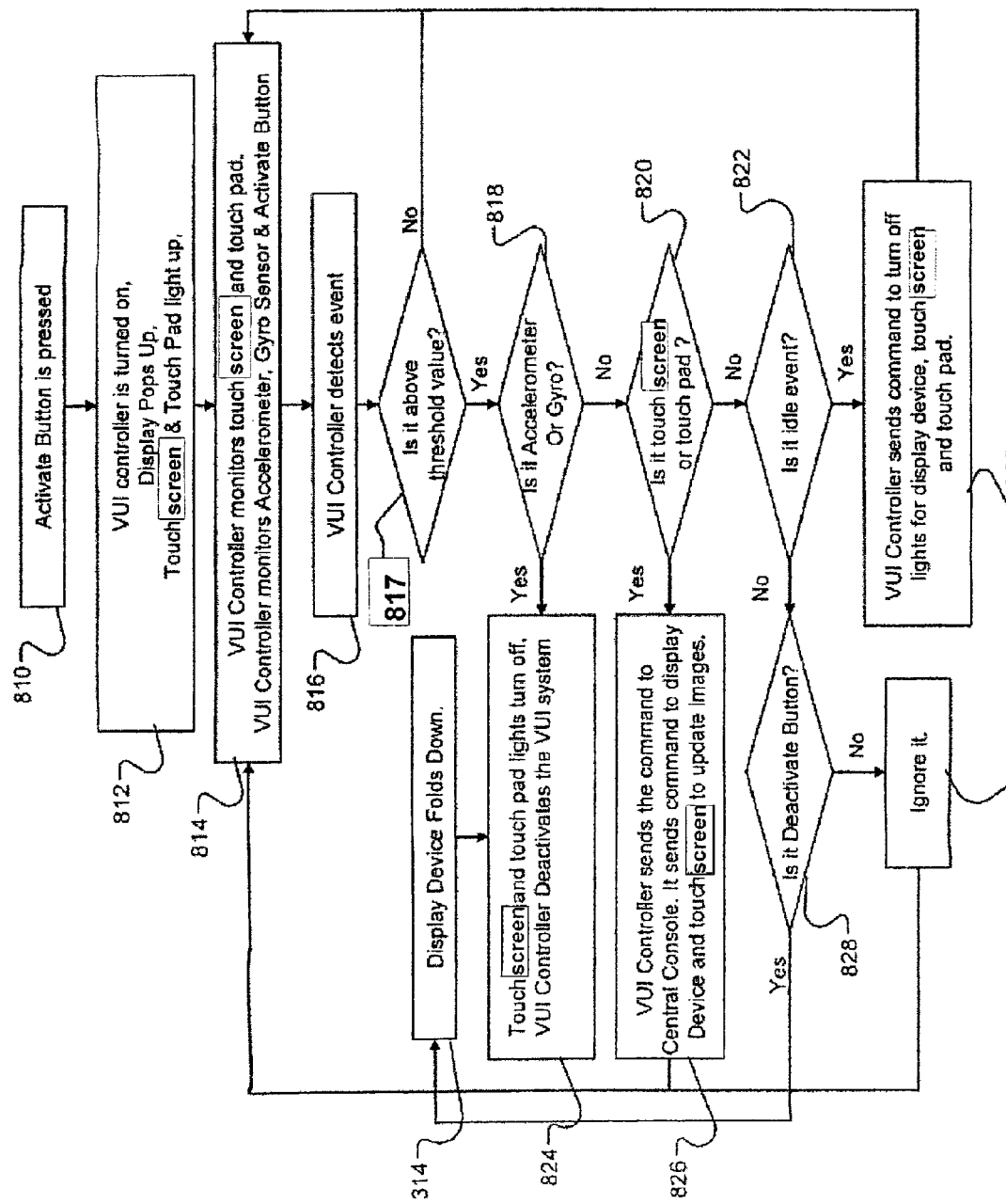

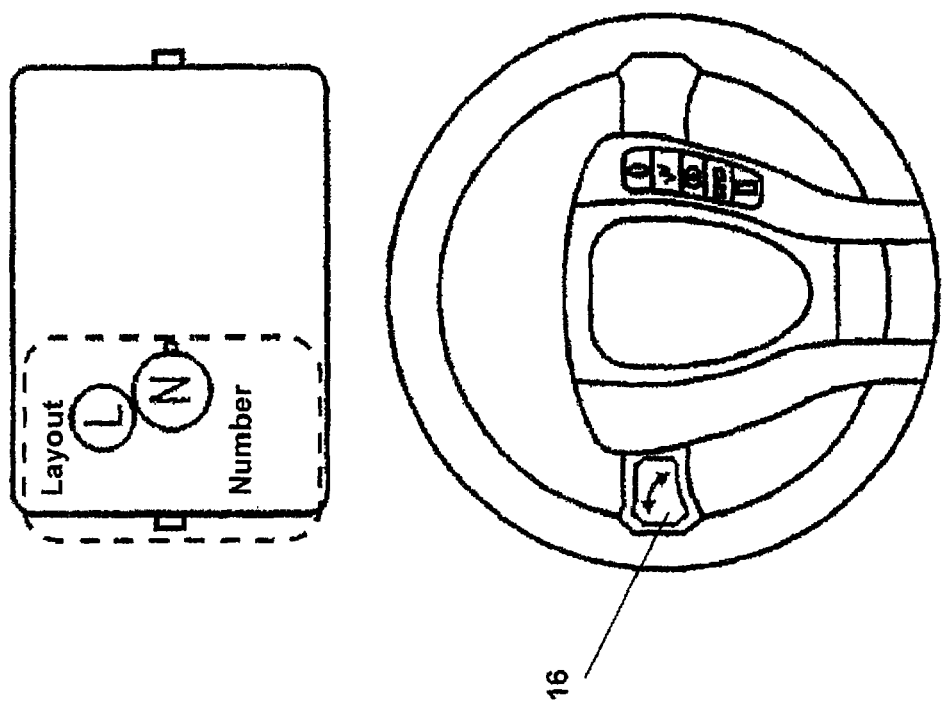

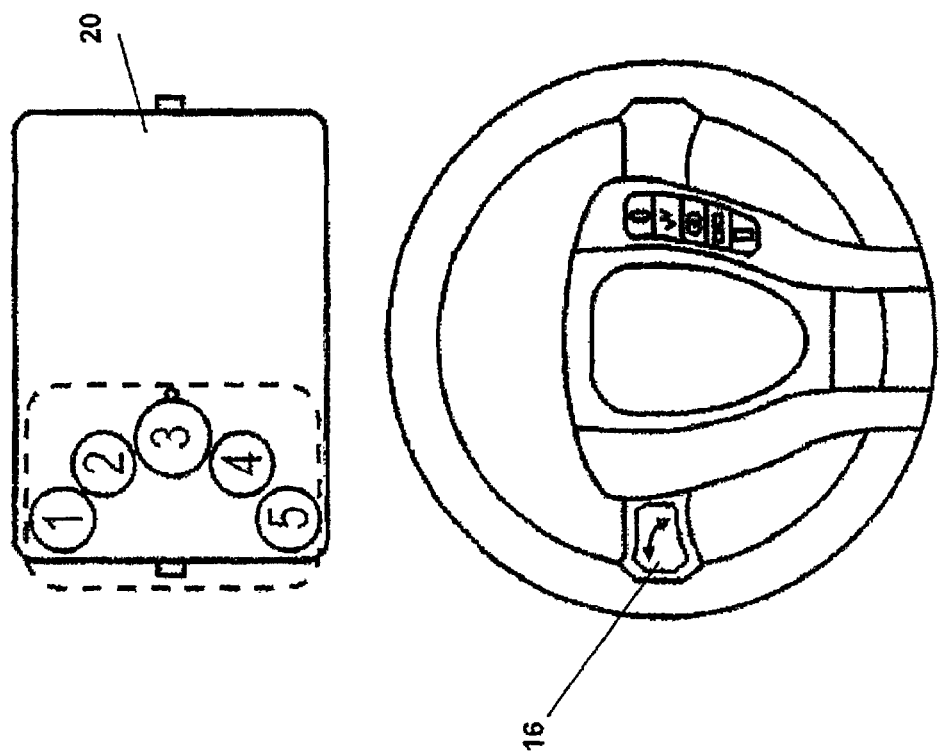

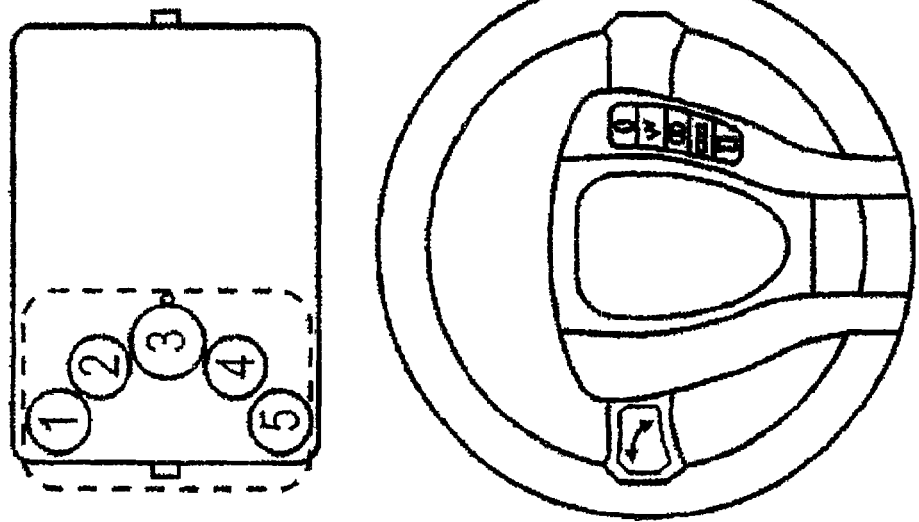

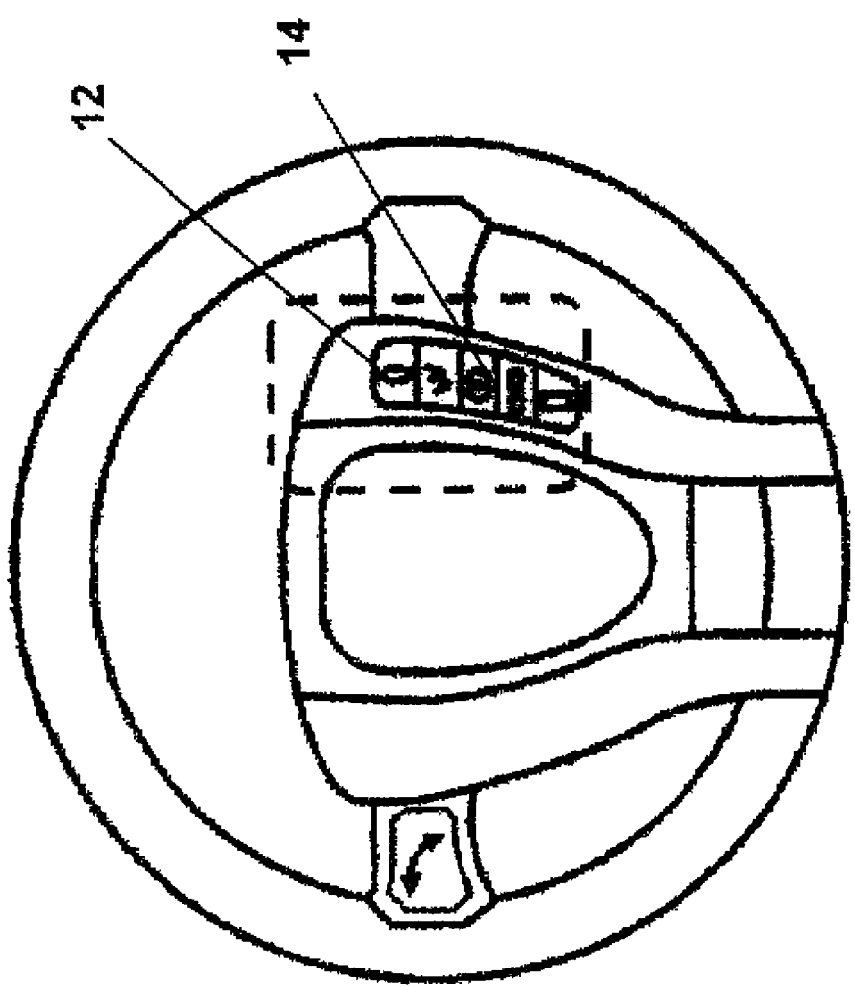

RECONFIGURABLE VEHICLE USER INTERFACE SYSTEM

FIELD

The present disclosure relates to a steering wheel vehicle user interface system.

BACKGROUND

This section provides background information related to the present disclosure which is not necessarily prior art.

Most, if not all, automobiles today have a central console to control many of the devices in the vehicle. For example, the central console may have buttons for controlling the Heating, Ventilating, and Air Conditioning (HVAC) system, the audio system, a navigation system or stored media files. Many of these vehicles may also include a set of predetermined shortcuts on the steering wheel, for the driver's convenience. For example, a steering wheel may include volume control buttons and/or radio control buttons. This allows the driver to easily control certain functions within the vehicle without removing his or her hands from the steering wheel.

These shortcuts, however, are hard wired in that the decision of which functions the shortcuts control and the physical location of the shortcuts is the decision of the car manufacturer. Accordingly, a user is limited in the shortcuts that he or she may use by the manufacturer's design choice. Thus, there is a need for a user input system that allows the user to select which shortcuts are available to the user, the location of these shortcuts, and the size of the shortcuts.

Furthermore, the short cuts are programmed only for the Original Equipment Manufacture (OEM) devices. A automobile owner wanting to update, for example, the automobile's audio system would have to do so at the expense of losing the use of the shortcuts for the OEM audio system. Thus, there is a further need for a user input system on the steering wheel that allows interoperability between the user input shortcuts and after-market devices.

SUMMARY

This section provides a general summary of the disclosure, and is not a comprehensive disclosure of its full scope or all of its features.

A reconfigurable vehicle user interface system is herein disclosed. The vehicle user interface comprises a steering wheel and a touch screen disposed along an outer surface of the steering wheel that generates a signal upon sensing user contact with a touch-sensitive surface of the touch screen, wherein the signal is dependent on location of the user contact. The vehicle user interface further comprises a controller that receives the signal generated by the touch screen and determines a function command from the signal based on the location of the user contact. The system also includes a plurality of input shortcut displayed on the touch screen, each user input shortcut has a mapping to a specific function command, wherein each user input shortcut displayed on the touch screen indicates to the user the specific function command that is mapped to user input shortcut. The vehicle user interface also comprises a touch screen reconfiguration module that receives a user configuration specified by the user indicating a configuration of the plurality of user input shortcuts and displays the plurality of user input shortcuts according to the user configuration, wherein the user configuration includes an amount of user input shortcuts to be displayed, locations of each of the user input shortcuts, sizes of each of the user input shortcuts, and the mapping of the location to function command of each of the user input shortcuts.

Further, a method for reconfiguring a graphical configuration of a touch screen displaying user input shortcuts on a steering wheel having a vehicle user interface system is also disclosed. The method comprising displaying on a display unit associated with vehicle user interface a query to a user for an amount of user input shortcuts to display on the touch screen and receiving the amount of user input shortcuts to display on the touch screen from the user. The method also includes displaying on the display unit a query for a layout of the user input shortcuts to display on the touch screen, wherein the request for a layout indicates a request for the locations of each of the user input shortcuts and sizes of each of the user input shortcuts and receiving the layout from the user. The method further comprises displaying on the display unit a query for a mapping of each user input shortcut, wherein the mapping links the location of the user input shortcut to a function command to control a device of the vehicle from the touch screen. The method also includes modifying a configuration file used to configure the graphical configuration of the touch screen in accordance with the received amount of user input shortcuts, the received layout of the user input shortcuts and the mappings of the user input shortcuts and displaying the user input shortcuts on the touch screen in accordance with the configuration file.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 8 illustrates an exemplary method for determining a transition in the operational state of the vehicle user interface system;

FIGS. 13A-13G depict an exemplary method for reconfiguring the user input shortcuts of the vehicle user interface system;

FIGS. 14A-14G depict an exemplary method for selecting the layouts of the user input shortcuts of the vehicle user interface system.

Corresponding reference numerals indicate corresponding parts throughout the several views of the drawings.

DETAILED DESCRIPTION

Example embodiments will now be described more fully with reference to the accompanying drawings.

As described above, many vehicle steering wheels have user input shortcut buttons on the steering wheel, which allow a user to enter input corresponding to a control function found on the central control panel of the vehicle. The present disclosure describes a vehicle user interface (VUI) system that allows a user to reconfigure user input shortcuts, so that a user may have the functionality of traditional electromechanical buttons, but the ability to customize the configuration of the interface system.

Figure 1:
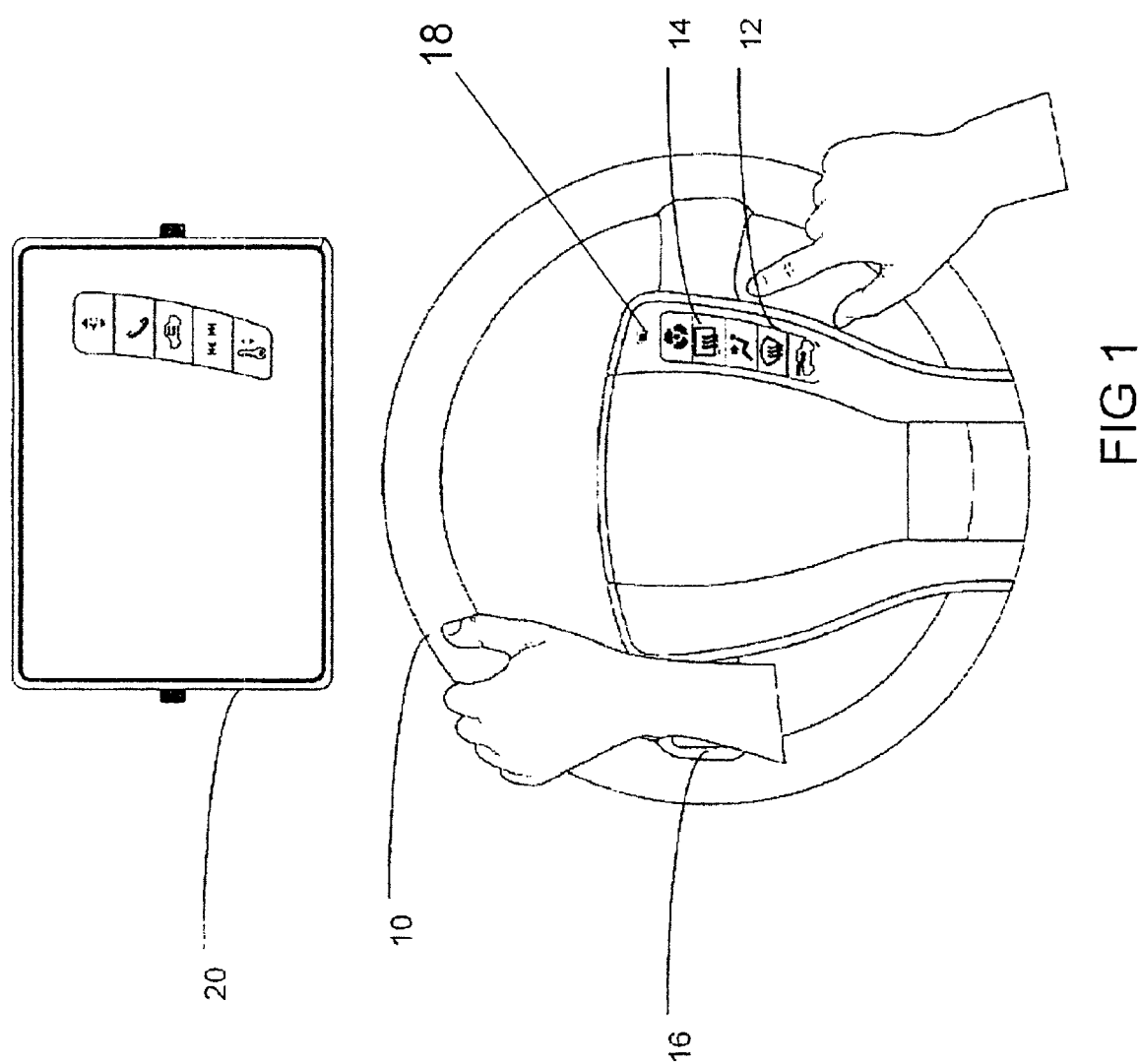
FIG. 1 illustrates an exemplary embodiment of a vehicle user interface of a steering wheel.

FIG. 1 depicts an exemplary embodiment of a steering wheel 10 of an automobile. The steering wheel 10 includes two touch sensitive input devices for entering user input, touch screen 12 is a touch screen that displays reconfigurable user input shortcuts 14. The touch screen 12 may be pressable or may be sensitive to mere user contact. Touchpad 16 is a touch pad that receives user input by the user dragging his or her finger or thumb along the surface of the touchpad 16. In some embodiments touchpad 16 may also be a touch screen. Further, touchpad 16 may also be pressable. The steering wheel may also include an activation button 18 and a display unit 20. Although not shown, a Bluetooth transceiver may be incorporated into the steering wheel as well. The Bluetooth transceiver may allow a user to control an external device via a Bluetooth connection without having the device be compatible with the vehicle's control system.

It is envisioned that configuration of the user input shortcuts 14 can be dependent on user preferences. For example, the user may be able to select which user input shortcuts 14 appear on the touch screen 12, the size of each user input shortcut 14, or an the amount of user input shortcuts 14. Greater detail on the reconfigurability of the user shortcuts 14 is provided below.

It is envisioned that the sensor technology of the touch screen 12 and touchpad 16 can be any known sensors. For example, touch screen 12 may be resistive touch screen, a capacitive touch screen, a projected capacitive touch screen, a surface acoustic wave touch screen, an optical touch screen (e.g. infrared), a strain gauge touch screen, a dispersive touch screen, acoustic pulse recognition touch screen, or any other touch screen sensor types now known or later developed. It is appreciated that some technologies may lend themselves better than others for purposes of an automobile steering wheel. For example, a resistive touch screen may be more sensitive than a capacitive touch screen to a user wearing driving gloves. Further, although the foregoing described sensor types in a touch screen, it is envisioned that these technologies may be incorporated into a touchpad as well.

In some embodiments, both or one of touch screen 12 and touchpad 16 may incorporate tactile, haptic, audio or visual response. For example, a user may forcibly press button 14 and the touch screen 12 may slightly vibrate upon being pressed, i.e. a haptic response. The touch screen 12 may also generate a clicking sound and/or light up the portion of the touchpad that the user is pressing. It is envisioned that other means of verifying to a user that an input was entered and received may be incorporated into the steering wheel touchpads.

Furthermore, small bumps on the surface of touch screen 12 may be provided so that a user does not have to look at the steering wheel to locate a specific point on the touch screen 12.

Figure 5A:
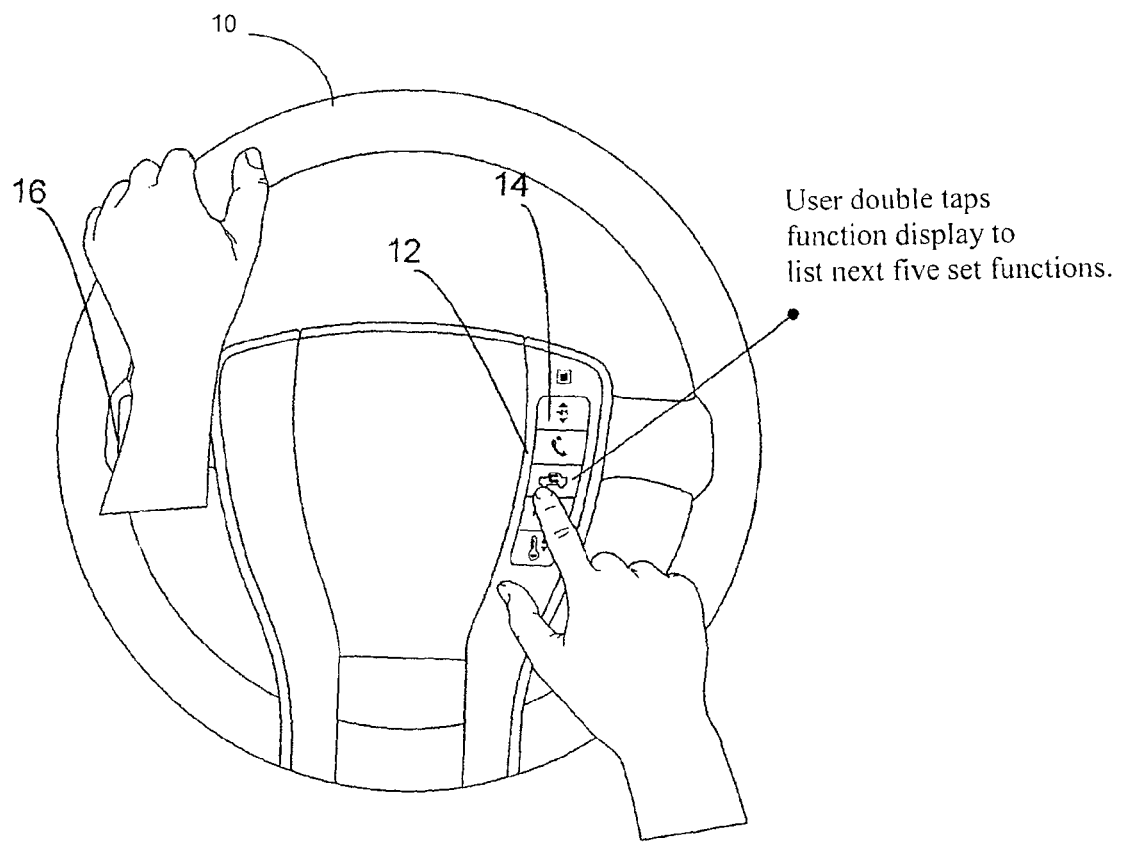
FIGS. 5A-5E depict an example of a user navigating using the user input shortcuts of the vehicle user interface system.
Figure 5B:
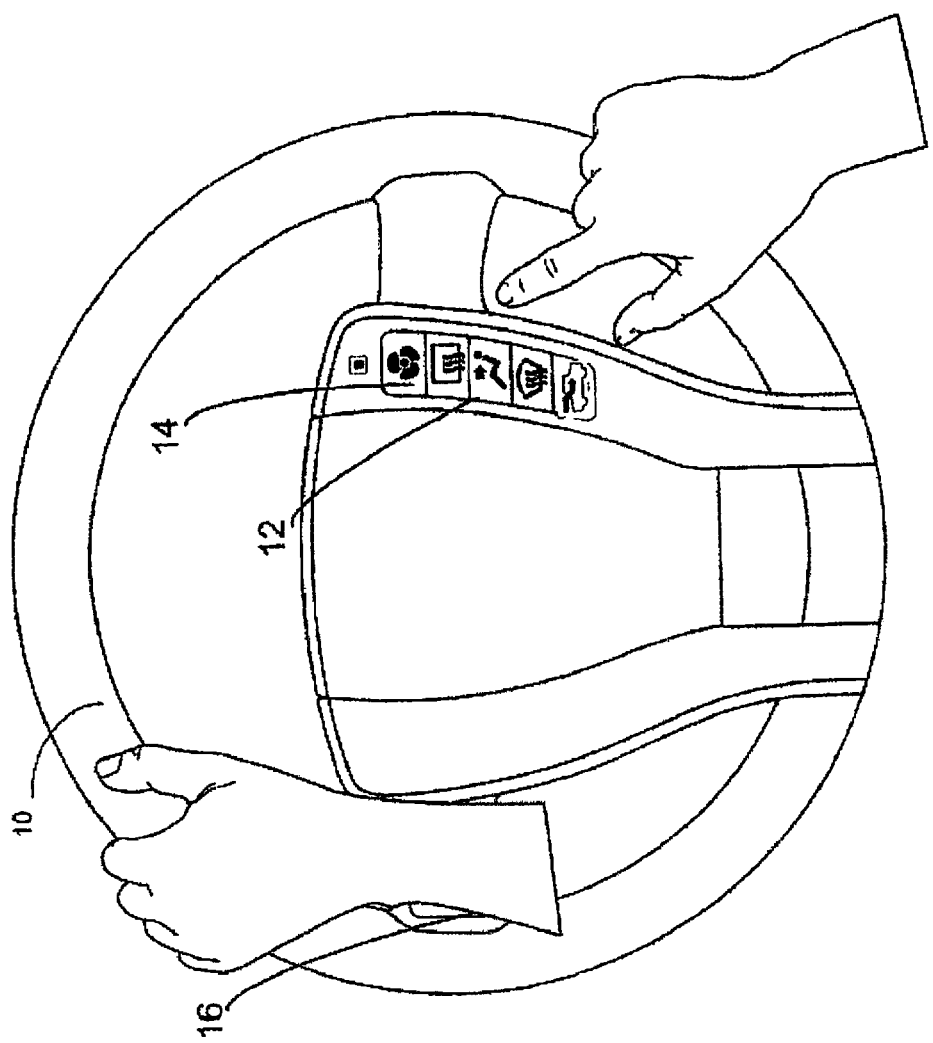
Figure 5C:
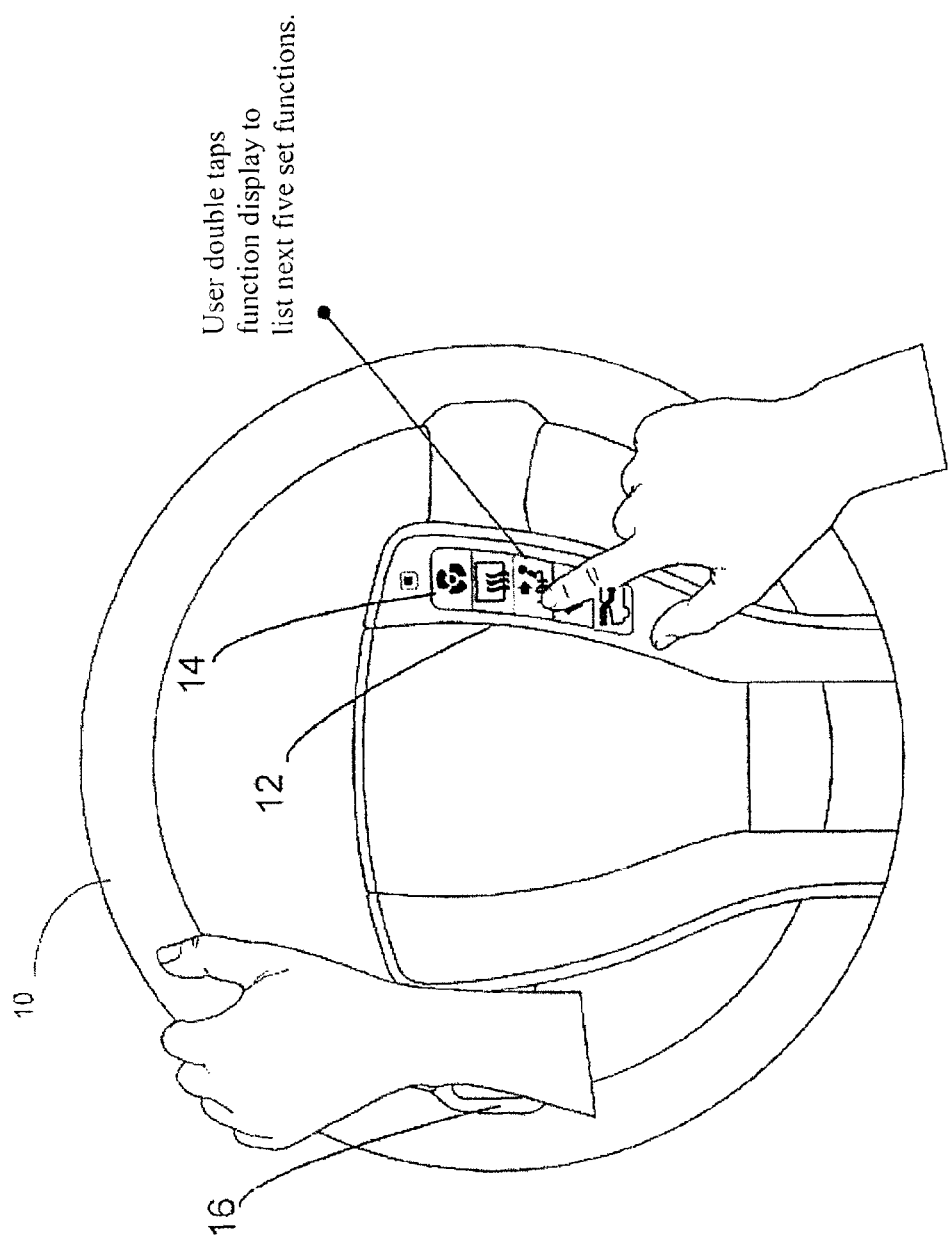
Figure 5D:
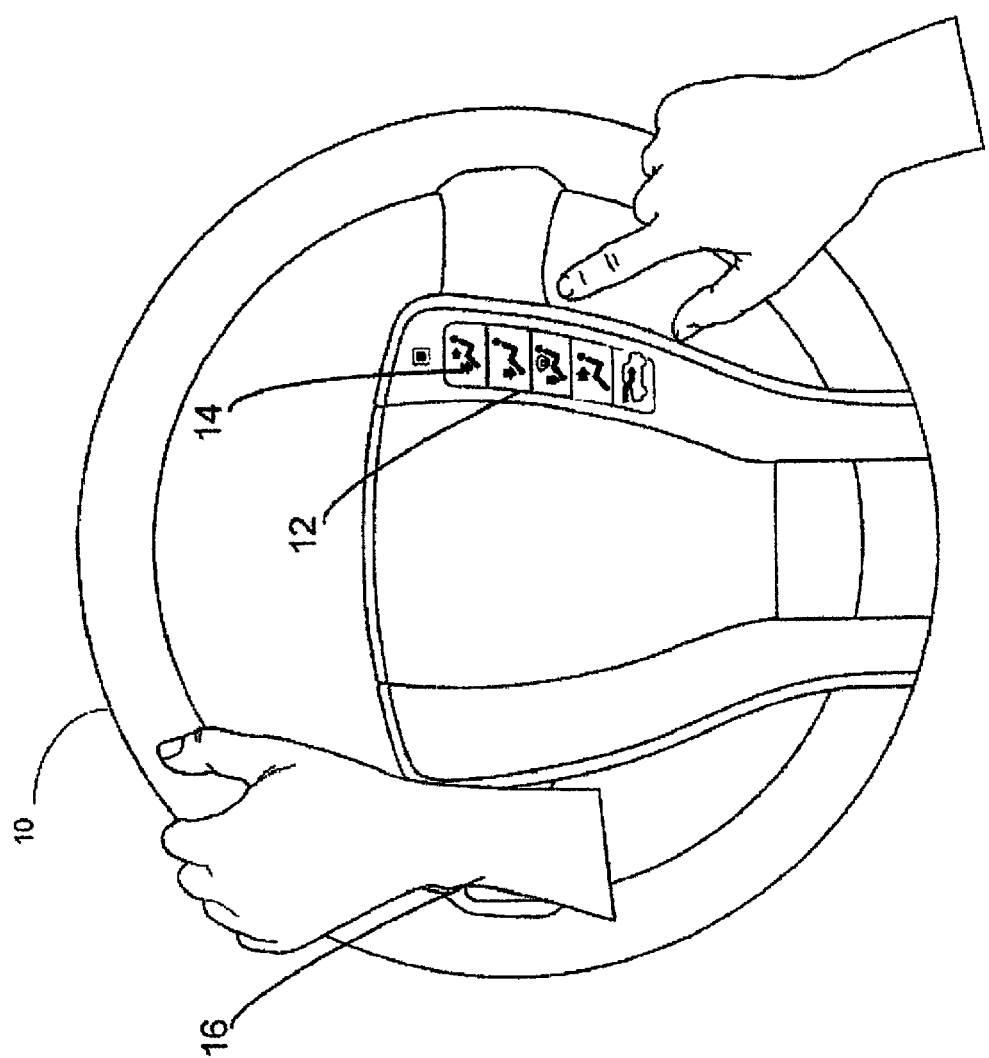
Figure 5E:
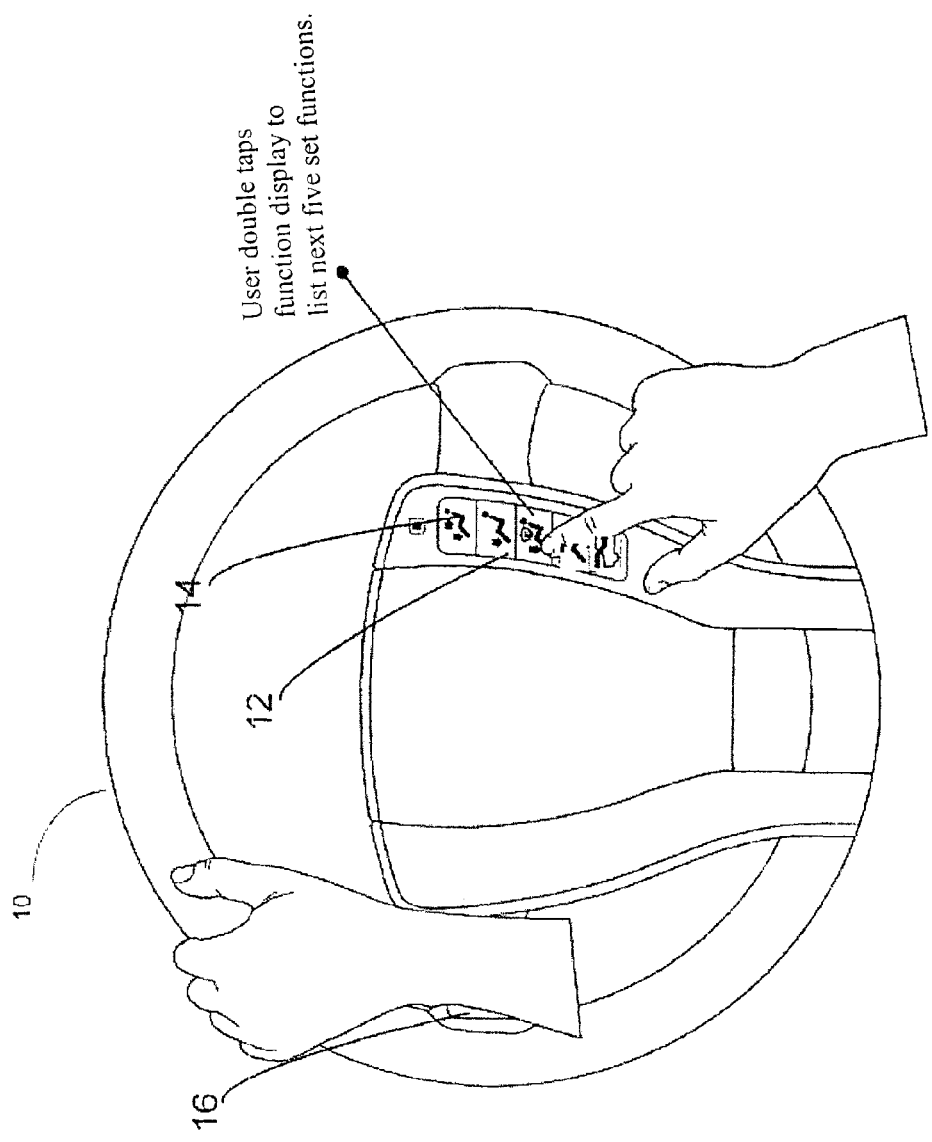

FIGS. 5A-5E depict an example of a user using the user input shortcuts 14 on the touch screen 12 to control a function of the vehicle. The figures show an example of a navigable menu, such that a user can go through multiple layers of menu options, so as to increase the total number of shortcuts available to the user. As can be seen in FIG. 5A, the user is touching the user input shortcut 14 associated with the vehicle's climate system. FIG. 5B shows the second menu, which is specific to the fan system. In FIG. 5C, the user selects the user input shortcut 14 corresponding to the fan locations. As shown in FIG. 5D, the user input shortcuts 14 all display fan location options. In FIG. 5E, the user taps the user input shortcut 14 corresponding to the defrost and lower fan. Although a three layer menu was described in the example, it is understood that the system may incorporate two level menus for specific function commands or even four layer menus.

Figure 13A:
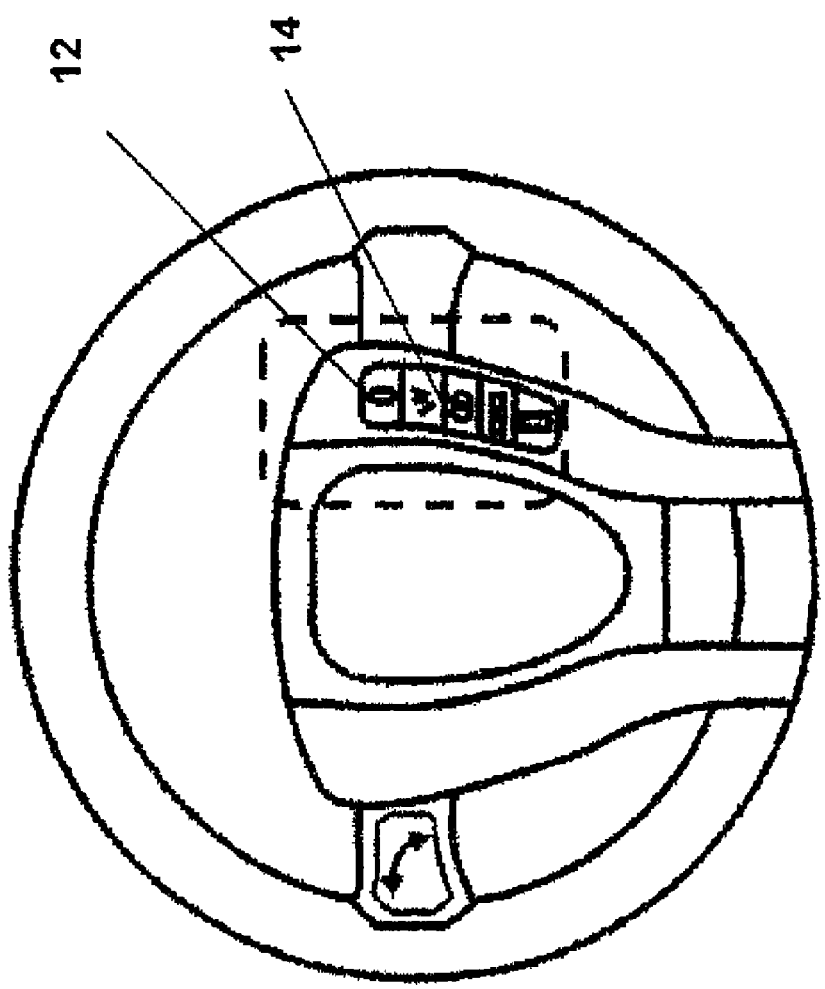

In FIGS. 5A-5E and 6A-6E, the user selects five user input shortcuts to be displayed on the touch screen 12. However, some users may not need five user input shortcuts 14. For example, a user may need only three user input shortcuts 14. Displaying unnecessary user input shortcuts 14 may cause an operating error. Thus, the present invention allows a user to flexibly select one through five user input shortcuts 14 to be displayed on the touch screen 12. FIGS. 13A-13G depict an exemplary method for reconfiguring the user input shortcuts 14 of the vehicle user interface system. In FIGS. 13A-13G, the user reconfigures an amount of the user input shortcuts 14, taking the following steps:

(Step 1) Press a user input shortcut 14 displayed on touch screen 12 for 3 seconds (FIG. 13A).

Figure 13B:
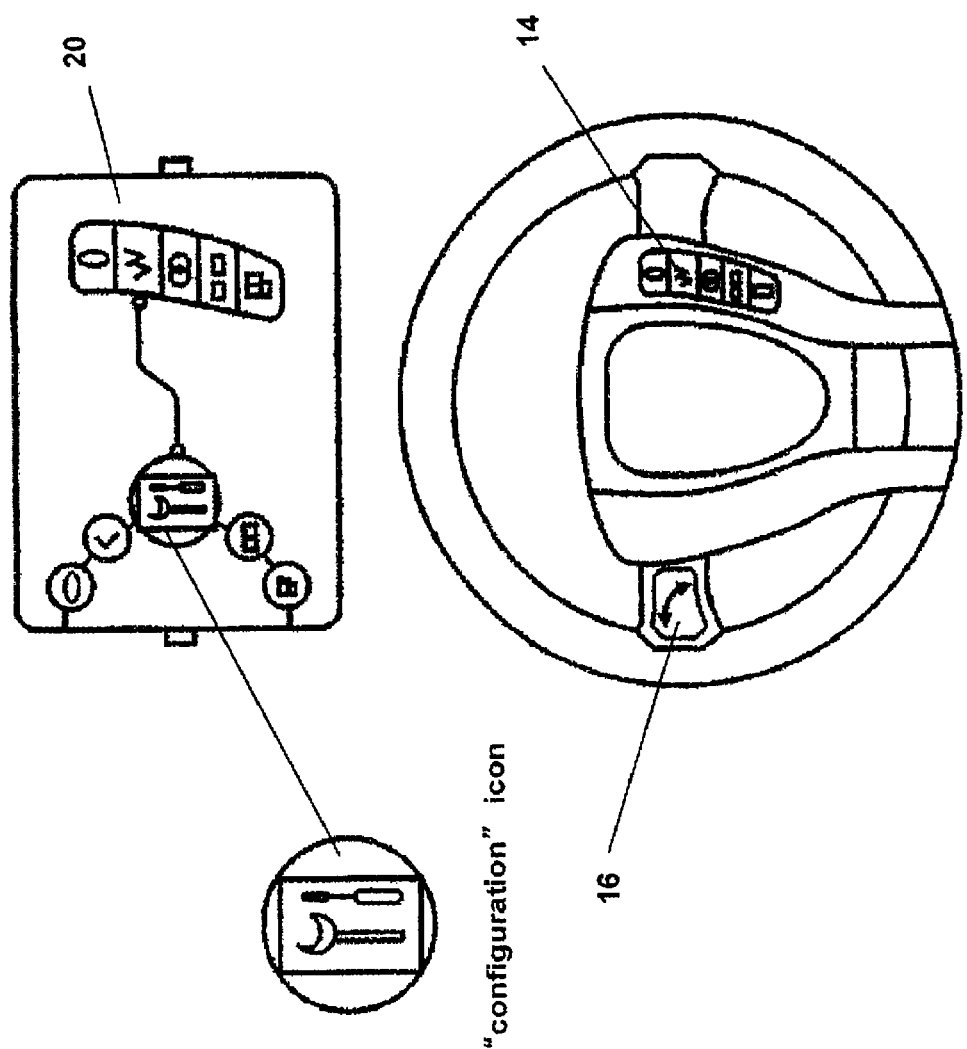

(Step 2) The current (customized) configuration of the user input shortcuts appears on the right side of the display 20, and the icons aligned in a semicircle appear on the left side of the display 20. Swipe up or down the touchpad 16 until reaching the "configuration" icon to select (FIG. 13B).

Figure 13C:
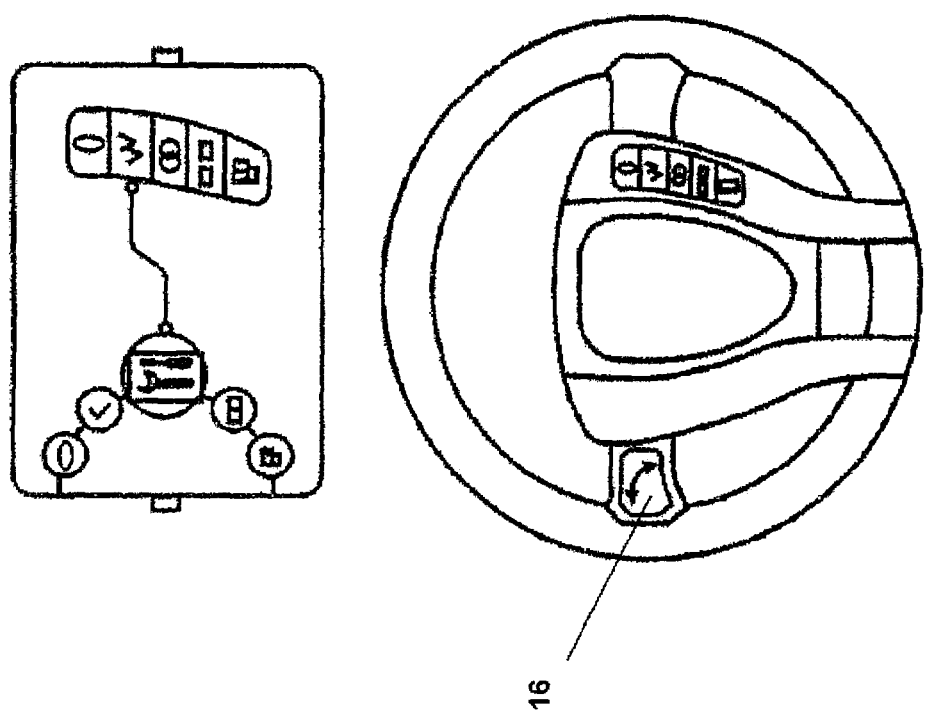

(Step 3) Tap the touchpad 16 twice to determine the selected "configuration" icon (FIG. 13C).

Figure 13D:
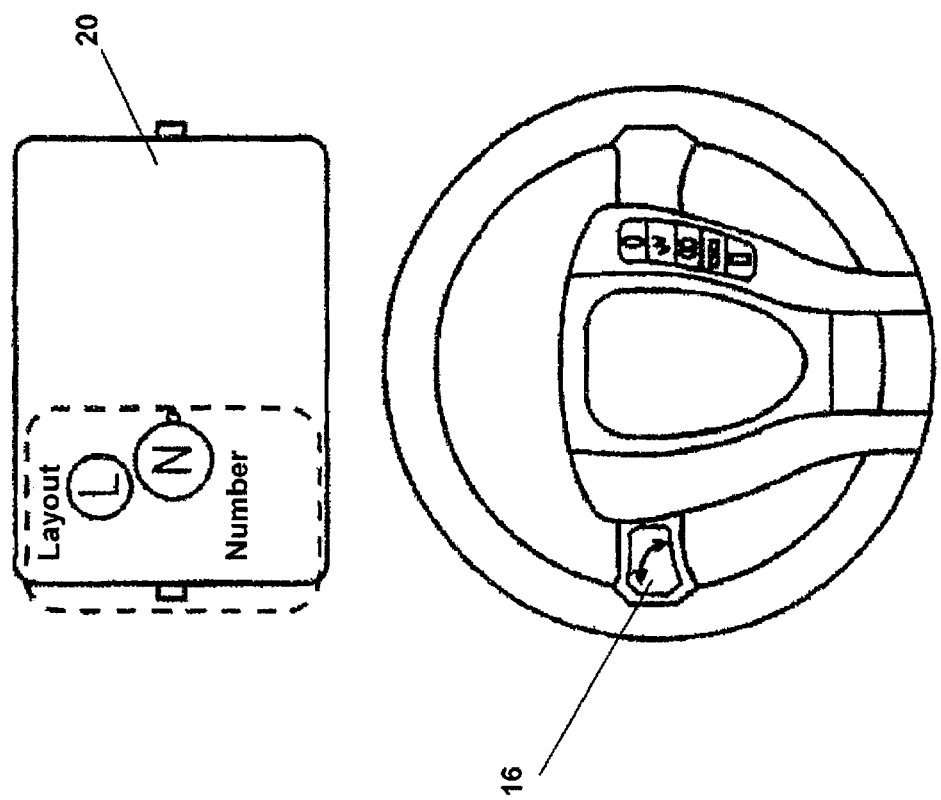

(Step 4) Then, a new screen appears to display 20 the "L" (layout) icon and the "N" (number) icon aligned in a semicircle on the left side of the display 20. Swipe up or down the touchpad 16 until reaching the "N" (number) icon to select (FIG. 13D).

(Step 5) Tap the touchpad 16 twice to determine the selected "N" (number) icon (FIG. 13E).

(Step 6) Then, a new screen appears to display five icons respectively with "1", "2", "3", "4", and "5" aligned in a semicircle on the left side of the 20. Swipe up or down the touchpad 16 until reaching the icon with the desired number to select (FIG. 13F).

(Step 7) Tap the touchpad 16 twice to determine the selected icon with the desired number (FIG. 13G).

In FIGS. 5A-5E and 6A-6E, the user selects five user input shortcuts 14 divided into five equal areas and displayed on the touch screen 12. However, as described above, an amount of the user input shortcuts 14 can be selected from one through five by customizing the configuration. The present invention further allows a user to select a desired layout of the selected number of the user input shortcuts 14 to be displayed on the touch screen 12. This provides the desired location of a function command, reduces operating errors, and offers comfortable operability. FIGS. 14A-14G depict an exemplary method for selecting the layouts of the user input shortcuts 14 of the vehicle user interface system. For example, after selecting three user input shortcuts 14, a user can select the desired layout of the three user input shortcuts 14 divided into three, four, or five equal areas. In FIGS. 14A-14G, the user selects an amount of the user input shortcuts 14, taking the following steps:

(Step 1) Press a user input shortcut 14 displayed on the touch screen 12 for 3 seconds (FIG. 14A).

Figure 14B:
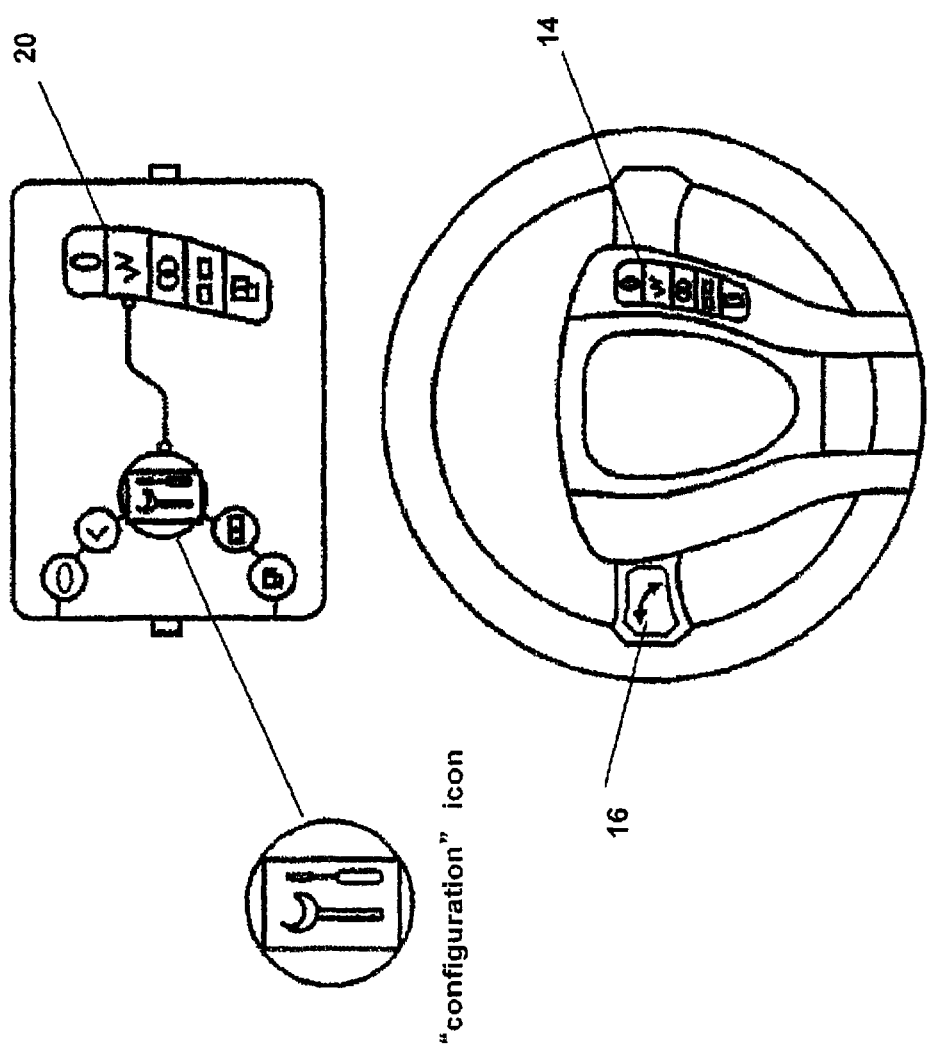

(Step 2) The current (customized) configuration of the user input shortcuts 14 appears on the right side of the display 20, and the icons aligned in a semicircle appear on the left side of the display 20. Swipe up or down the touchpad 16 until reaching the "configuration" icon to select (FIG. 14B).

Figure 14C:
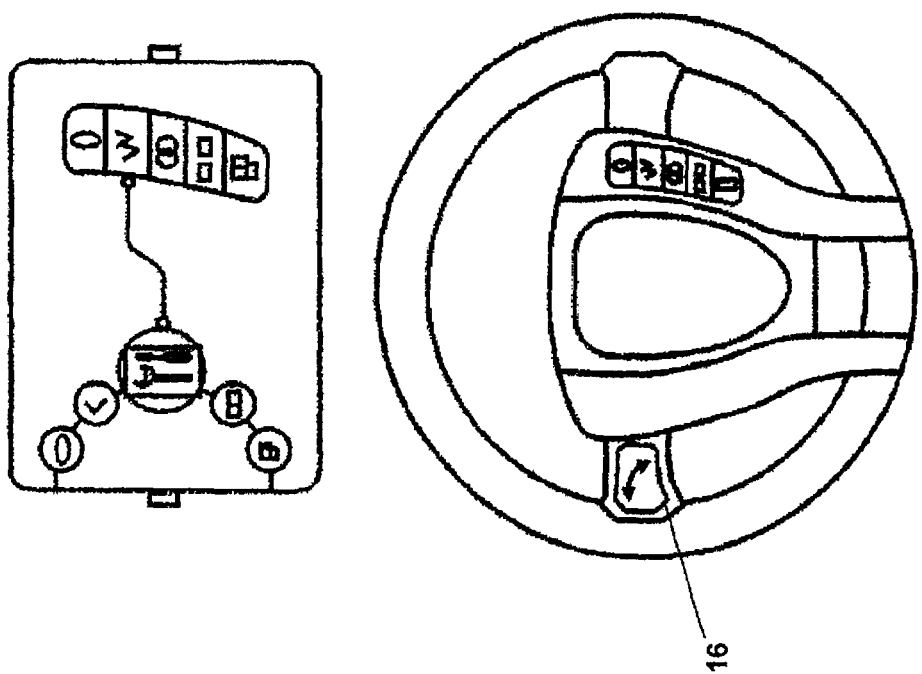

(Step 3) Tap the touchpad 16 twice to determine the selected "configuration" icon (FIG. 14C).

Figure 14D:
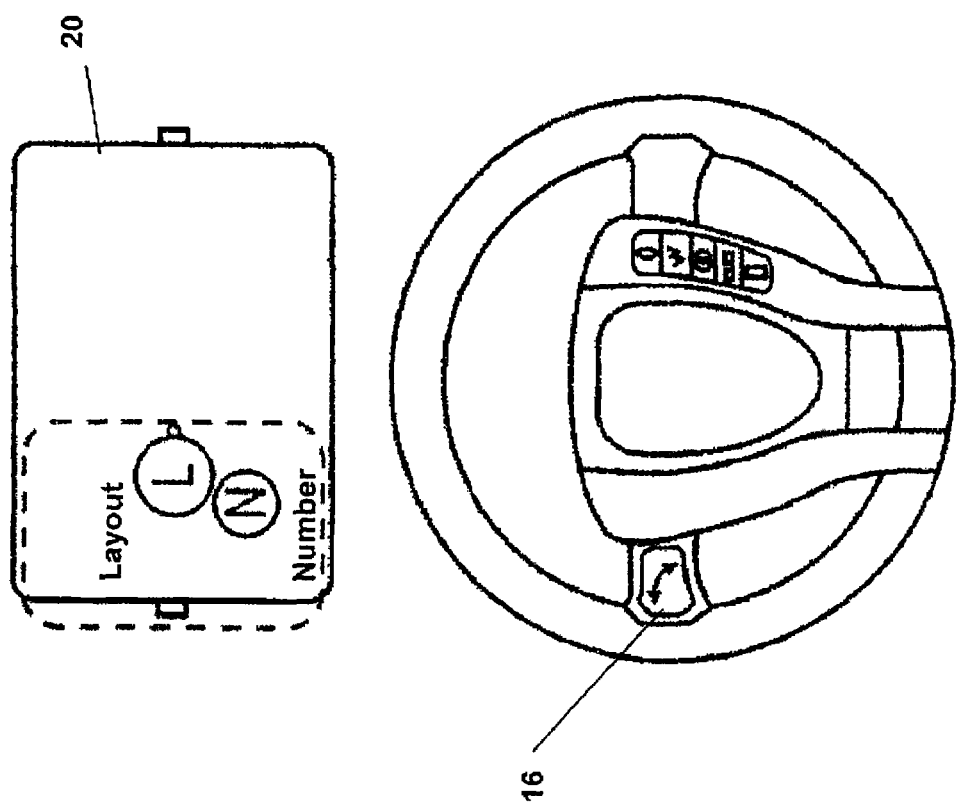

(Step 4) Then, a new screen appears to display 20 the "L" (layout) icon and the "N" (number) icon aligned in a semicircle on the left side of the display 20. Swipe up or down the touchpad 16 until reaching the "L" (layout) icon to select (FIG. 14D).

Figure 14E:
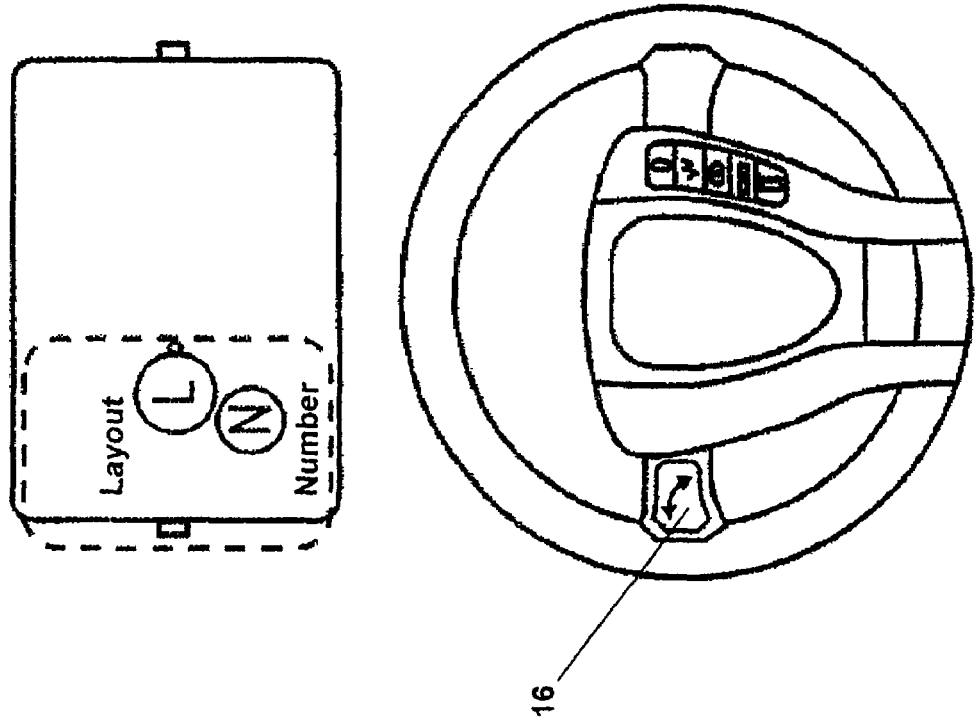

(Step 5) Tap the touchpad 16 twice to determine the selected "L" (layout) icon (FIG. 14E).

Figure 14F:
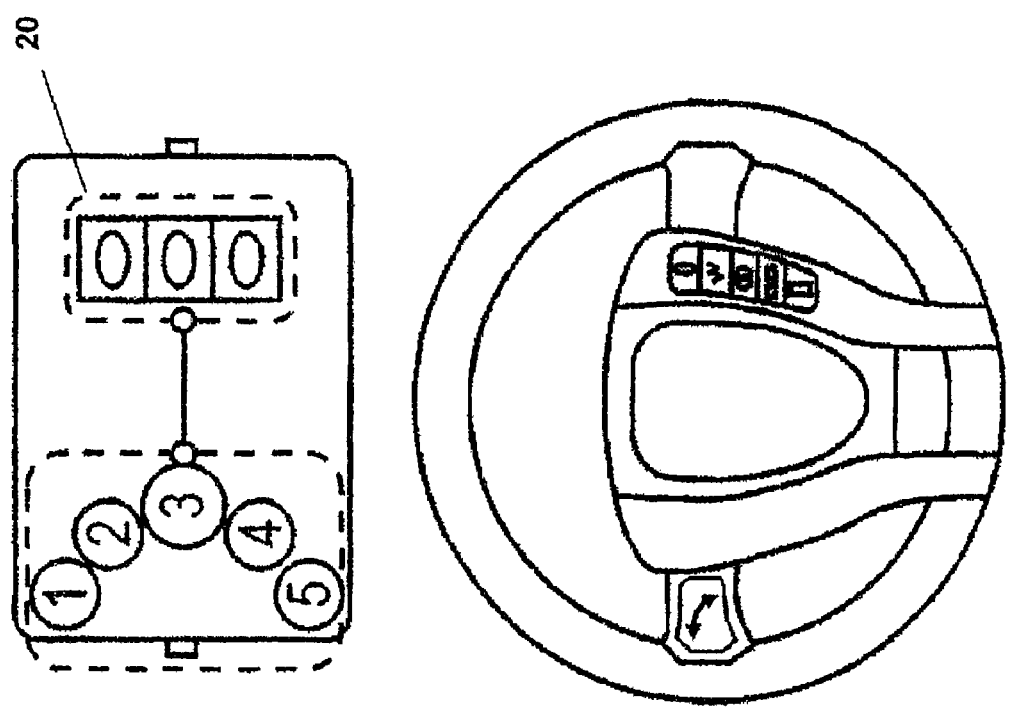

(Step 6) Then, a new screen appears to display five icons respectively with "1", "2", "3", "4", and "5" aligned in a semicircle on the left side of the 20. A layout image in accordance with each number appears on the right side of the display 20. Swipe up or down the left side touchpad until reaching the icon with the desired number to select (FIG. 14F).

Figure 14G:
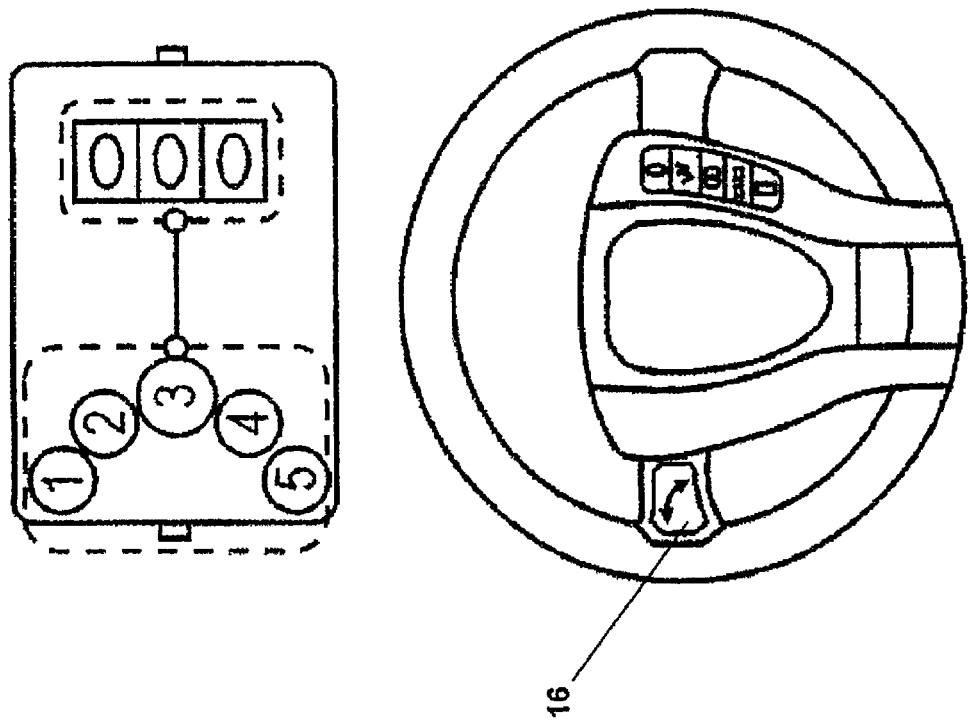

(Step 7) Tap the touchpad 16 twice to determine the selected icon with the desired number (FIG. 14G).

Figure 15:
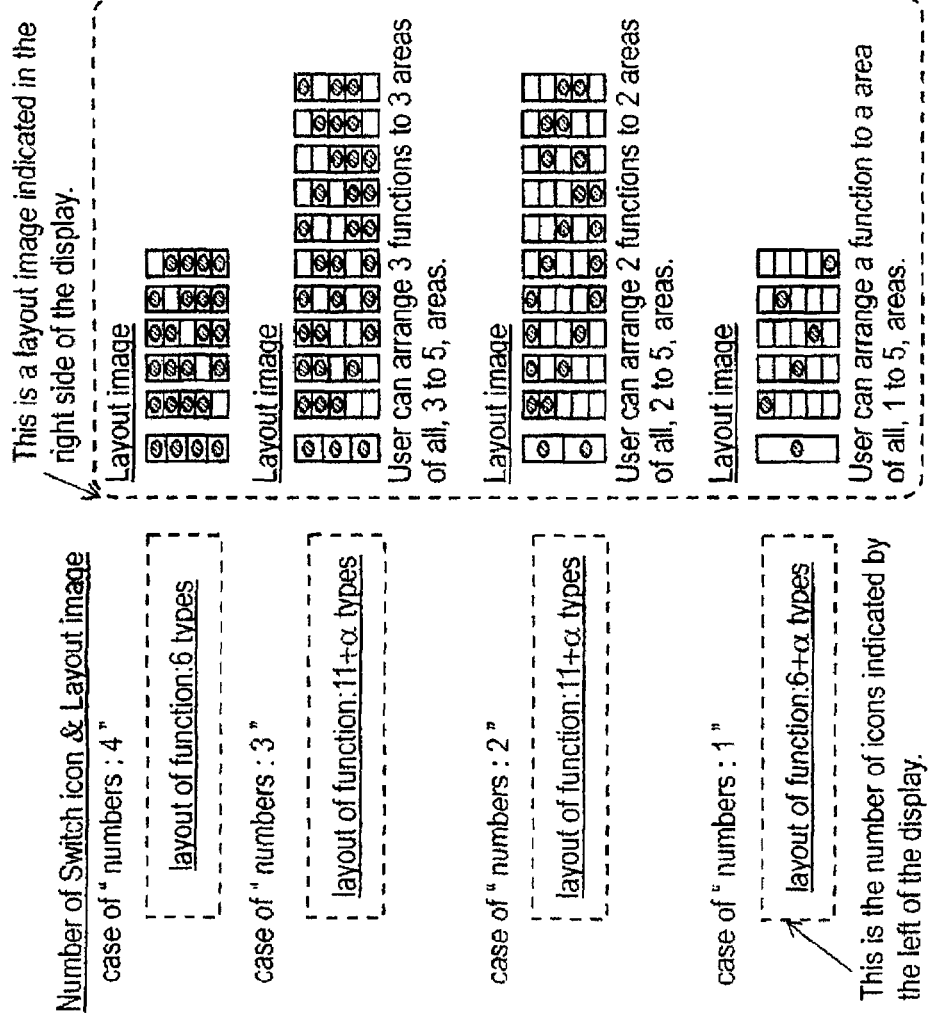
FIG. 15 illustrates flexibility in the layouts of the user input shortcuts of the vehicle user interface system.

FIG. 15 illustrates flexibility in the layouts of the user input shortcuts 14 of the vehicle user interface system. In FIG. 15, a variety of layout images corresponding to one through four user input shortcuts 14 are shown. A user can select a layout based on an amount of user input shortcuts 14 to be displayed, locations of each of the user input shortcuts 14, and sizes of each of the user input shortcuts 14.

Figure 6A:
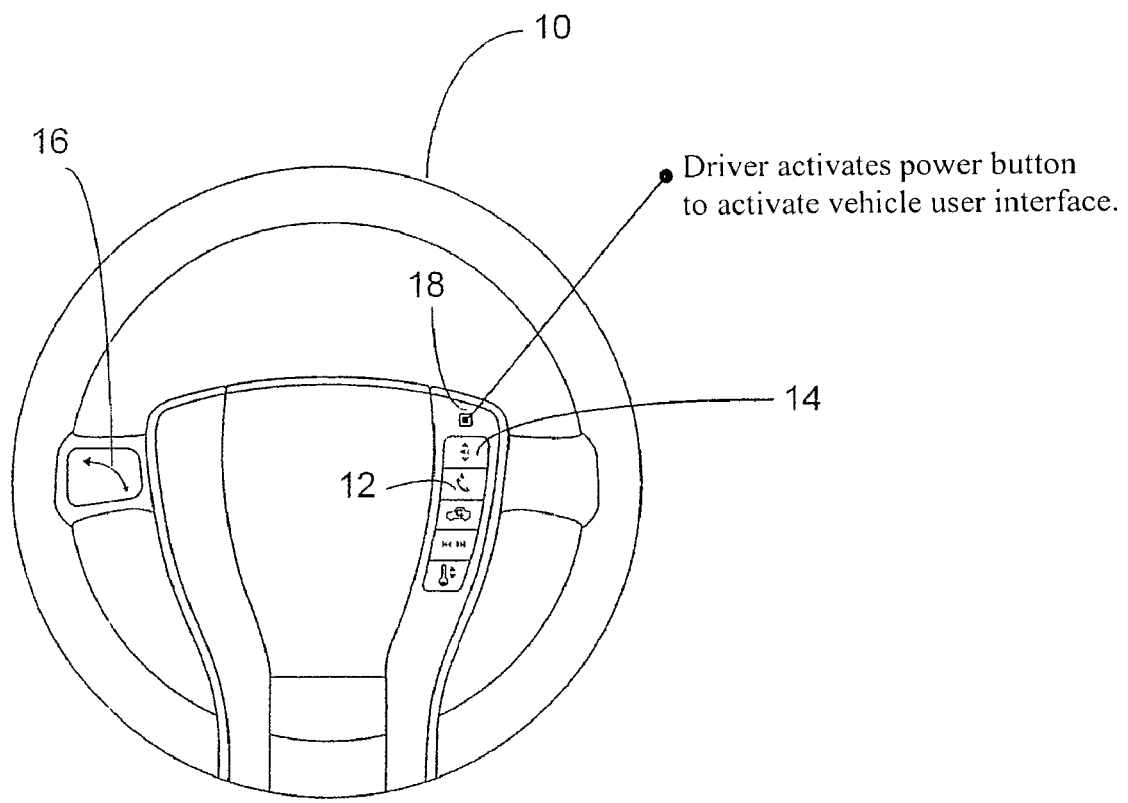
FIGS. 6A-6E depict an example of a user navigating through the menu of the vehicle user interface system.
Figure 6B:
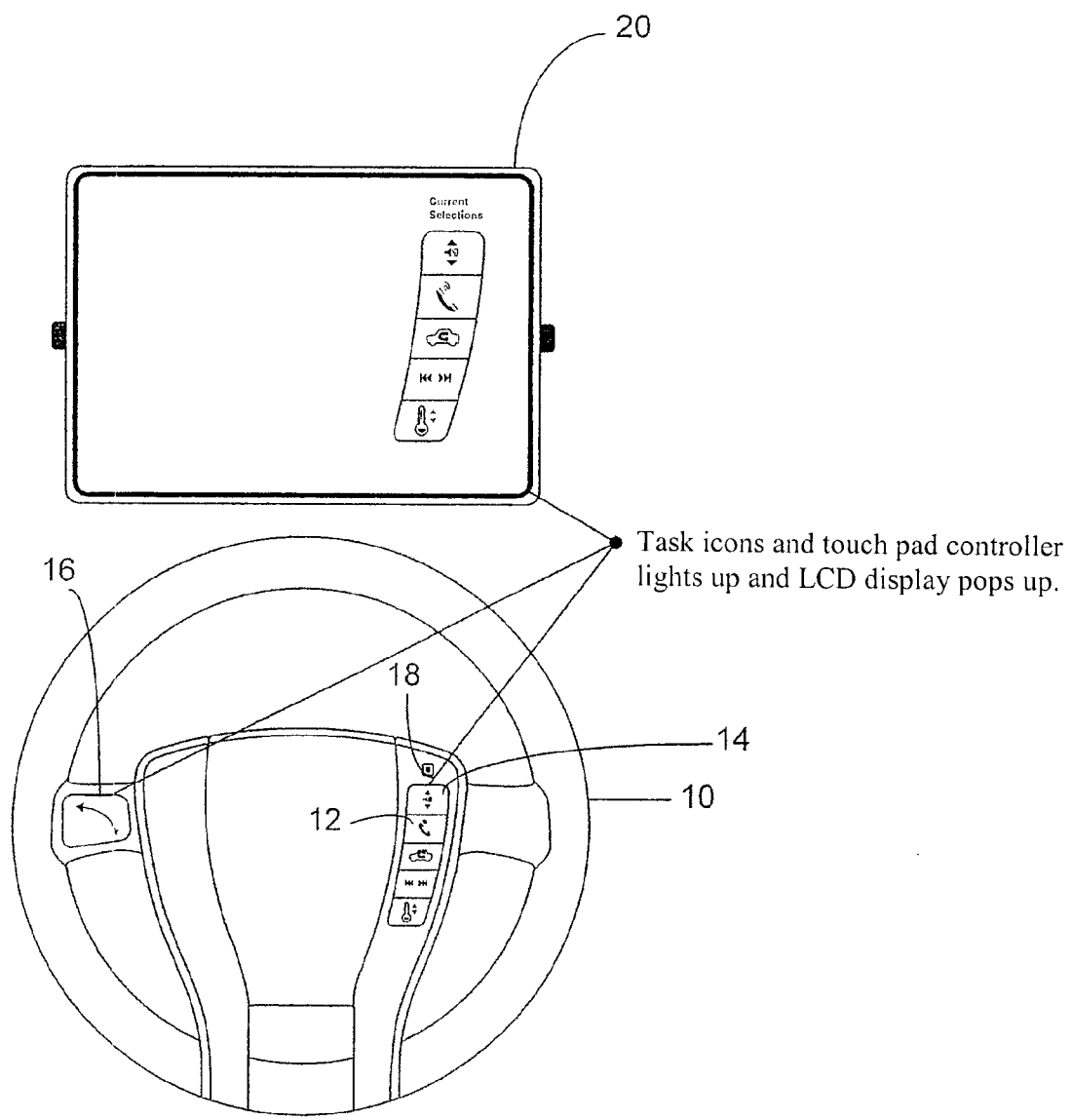
Figure 6C:
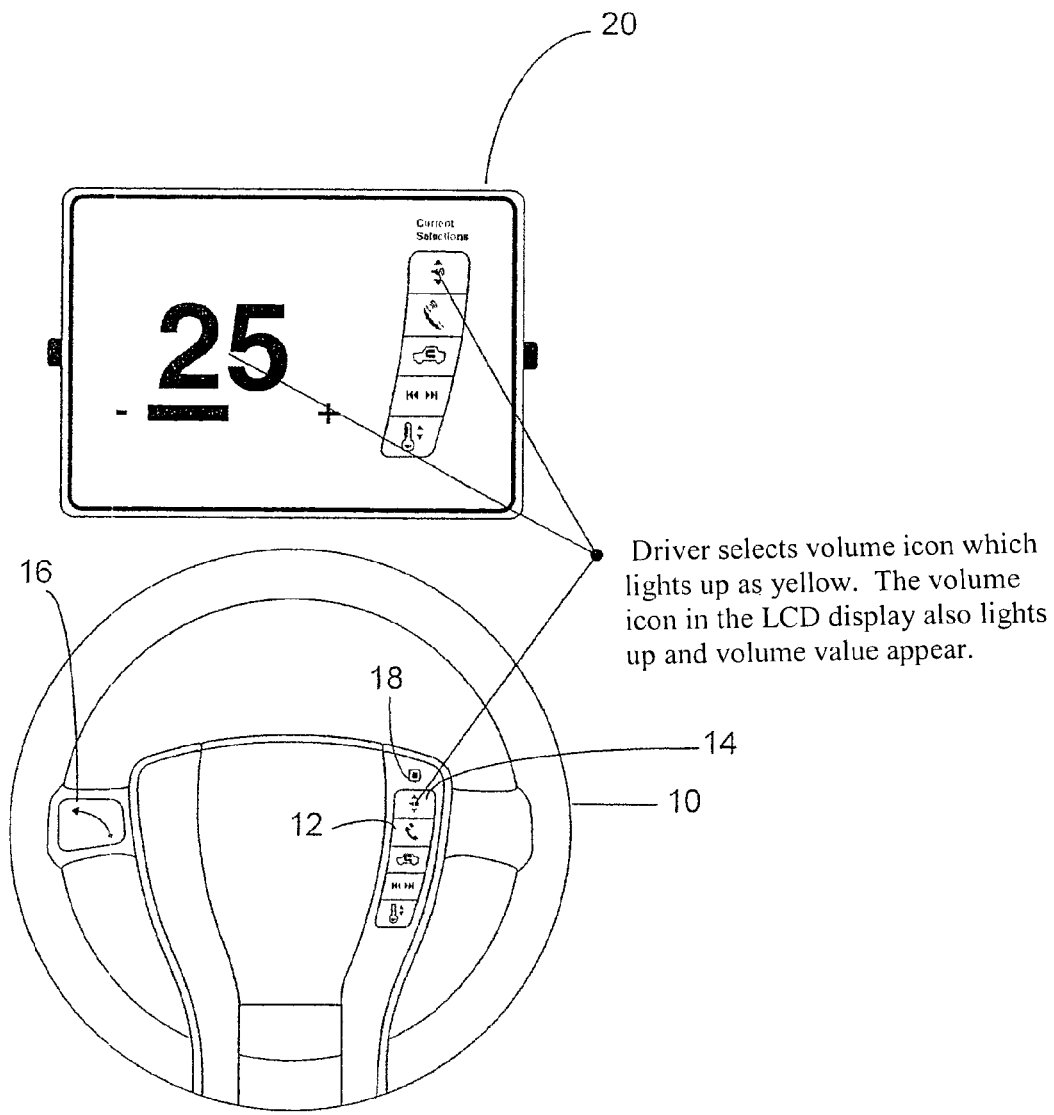
Figure 6D:
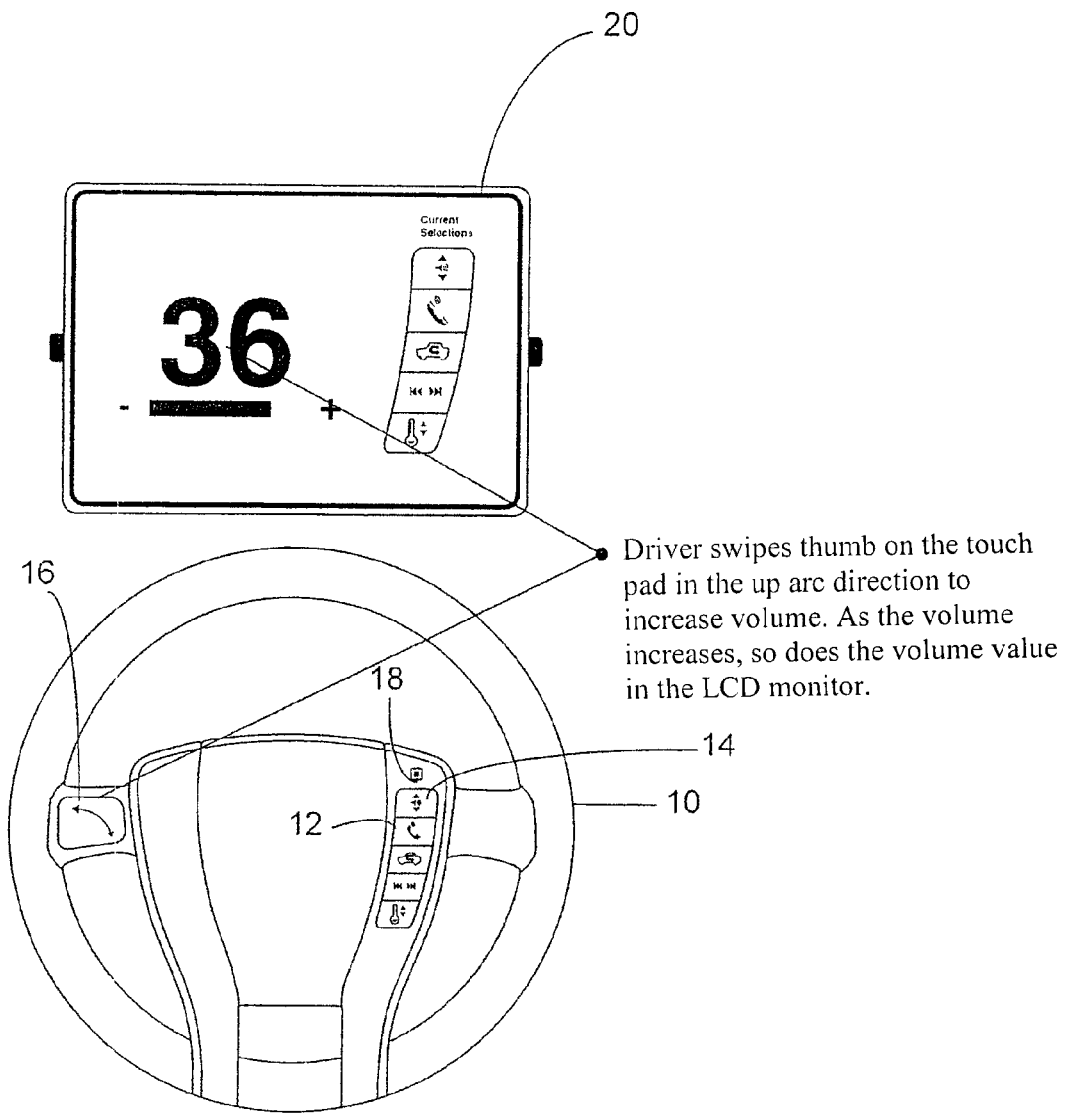
Figure 6E:
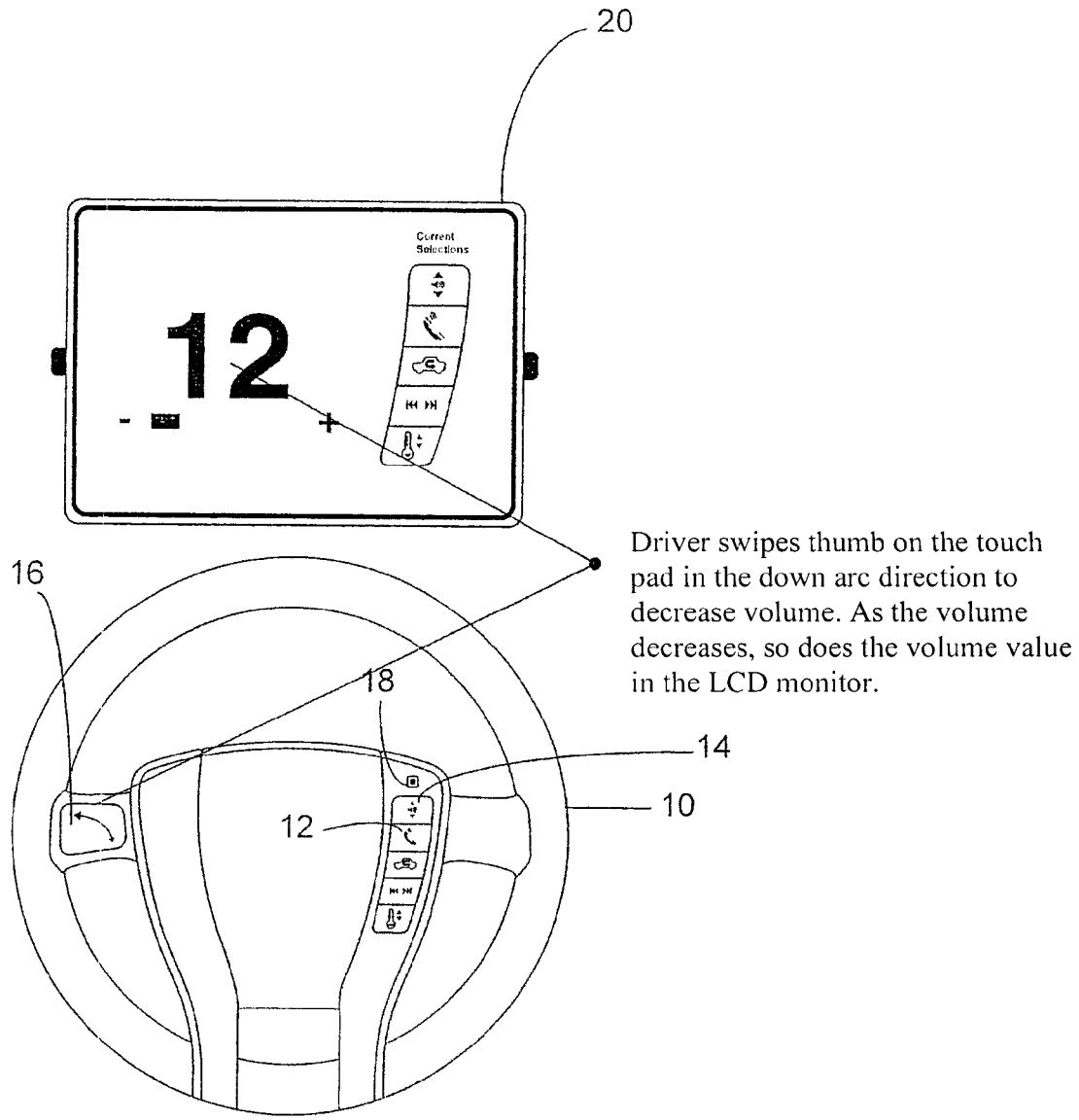

FIGS. 6A-6E depict an example of the user using the touch screen 12, the touchpad 16 and the display 20 to change the volume of the audio system. In FIG. 6A, the user can press the activation button 18 to activate the VUI system. In FIG. 6B, the touchpad 16 and touch screen 12 light up and the display unit 20 unfolds in front of the user. In FIG. 6C, the user can touch the top user input shortcut 14 displaying an icon of the volume control, upon which the volume level is displayed on the display unit 20. In FIG. 6D, the user can swipe the touchpad up or down to control the volume levels. As the user swipes the touchpad in an upwardly fashion, the volume increases, and the volume level displayed on the display unit 20 is adjusted accordingly. In FIG. 6E, the user can swipe the touchpad 16 in a downwardly fashion to decrease the volume. The display 20 displays the decreased volume level.

Figure 2:
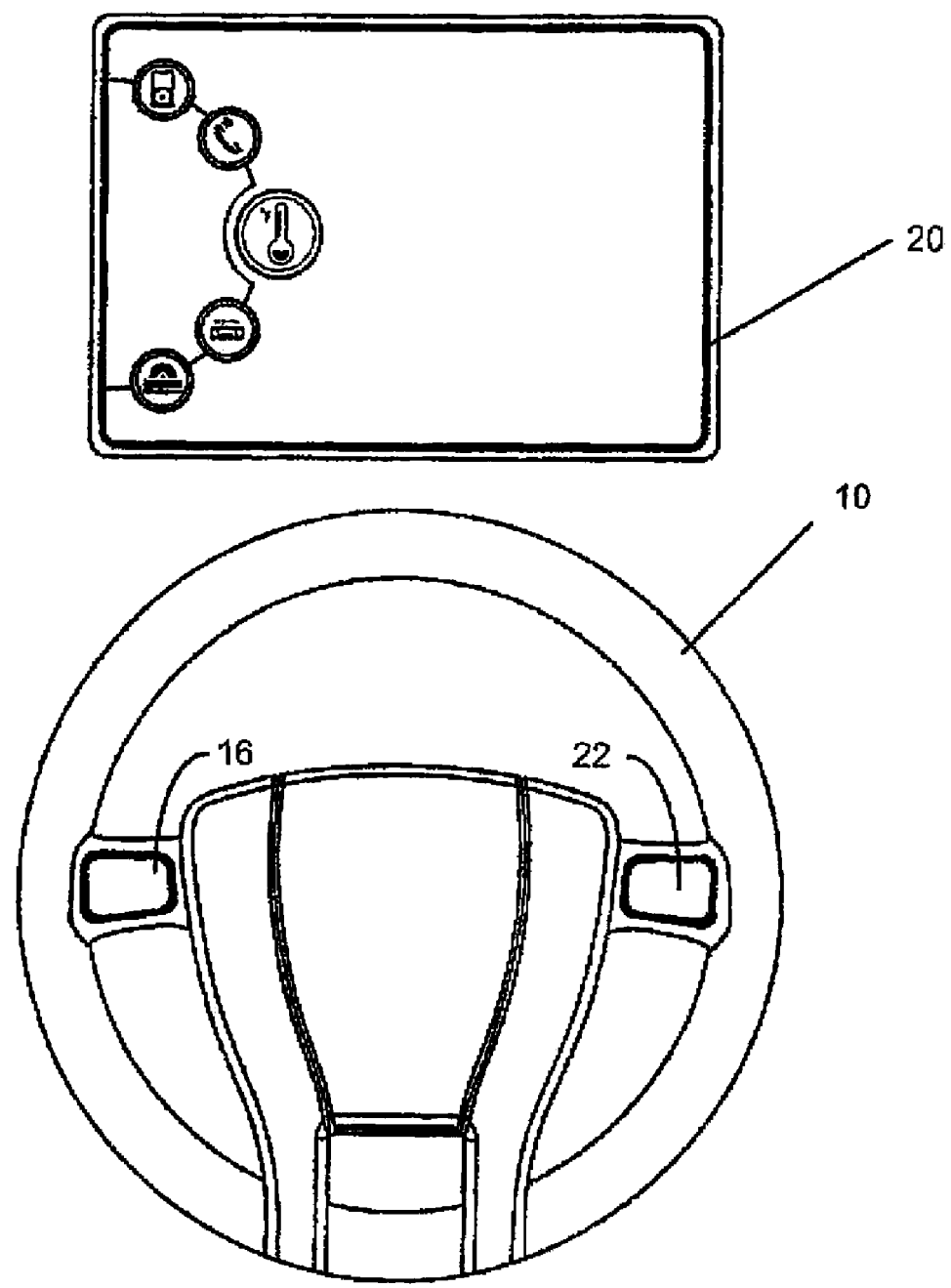
FIG. 2 illustrates an exemplary embodiment of a vehicle user interface of a steering wheel.

FIG. 2 depicts another embodiment of an automobile steering wheel 10. The steering wheel 10 can have two touchpads 16 and 22. In these embodiments, touchpads 16 and 22 are both coupled to a display 12. The display 12 can display the user input shortcuts to the user and can display levels of the device parameter being controlled. The user uses the touchpads to navigate the user interface to control a function of the automobile. It is envisioned that a Bluetooth transceiver may be integrated into the steering wheel 10 of FIG. 2 as well.

The touchpads 16 and 22 may be pressable and may provide one or more of a tactile response, a haptic response, an audio response, and a visual response. Further, the touchpads 16 and 22 may incorporate any of the sensor technologies discussed above.

The systems of FIGS. 1 and 2 allow for assignable user input shortcuts that provide direct control for tasks with one or two touches. The integration of a display and the touchpads simplifies complex controls such as navigating through a contact list, selecting a contact from the list and dialing the contact. Similarly, selecting a media file from a list of media files may also be accomplished using the touchpad and the device.

Figure 7A:
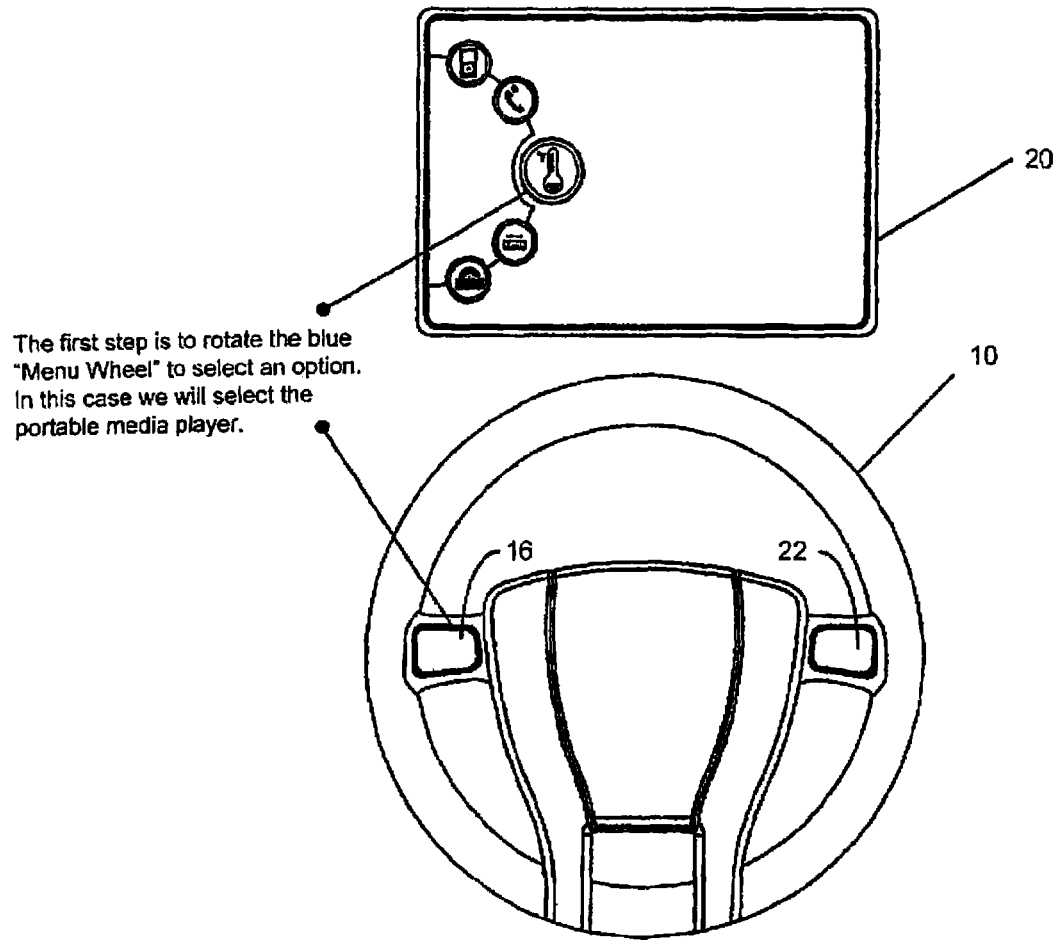
FIGS. 7A-7R depict an example of a user navigating through the menu of the vehicle user interface system.
Figure 7B:
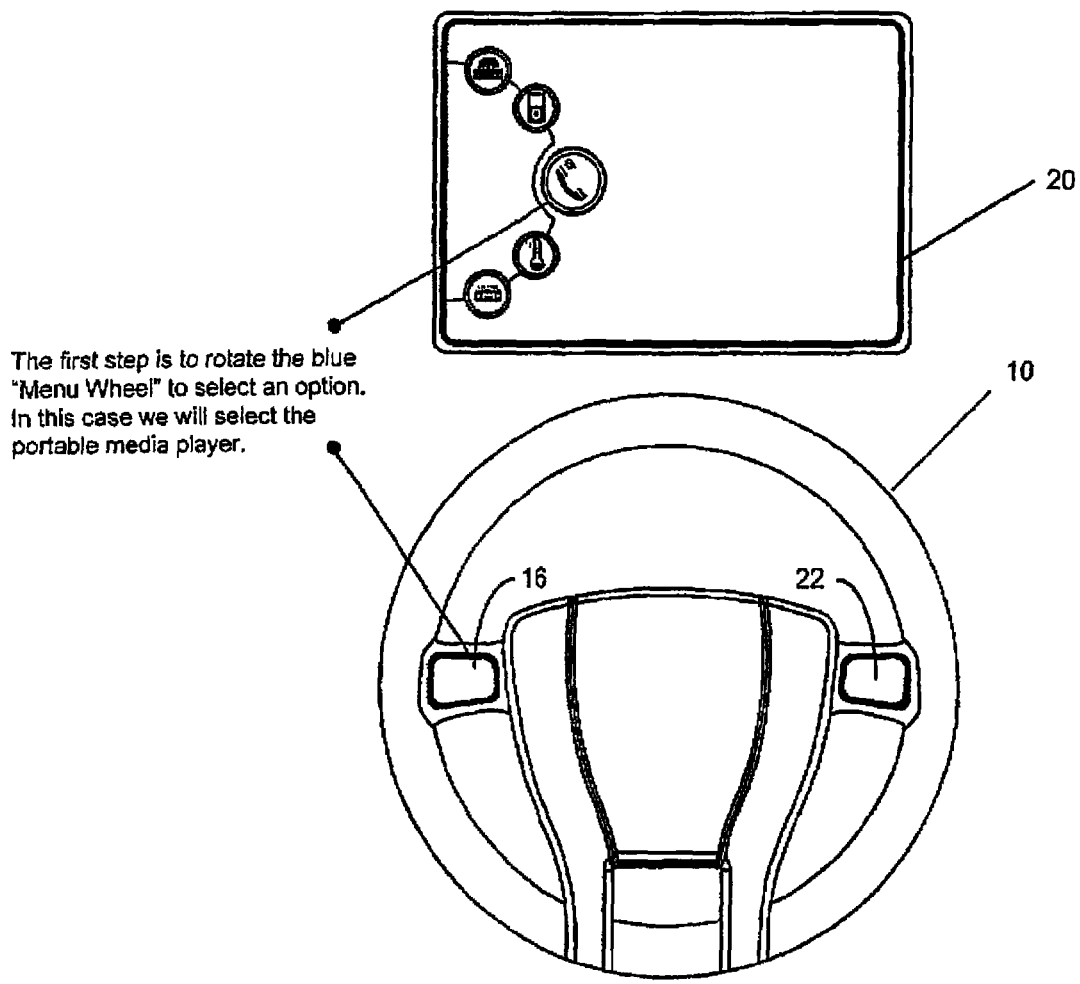
Figure 7C:
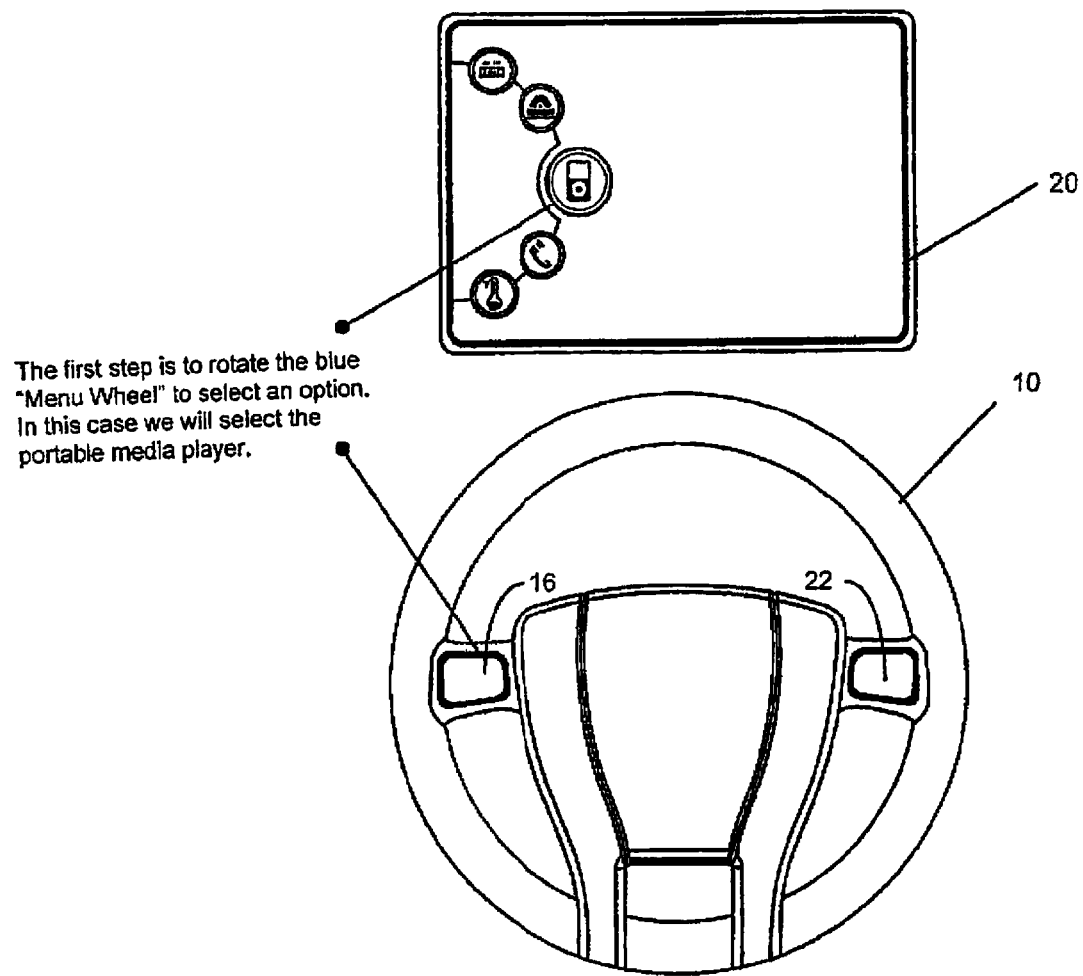
Figure 7D:
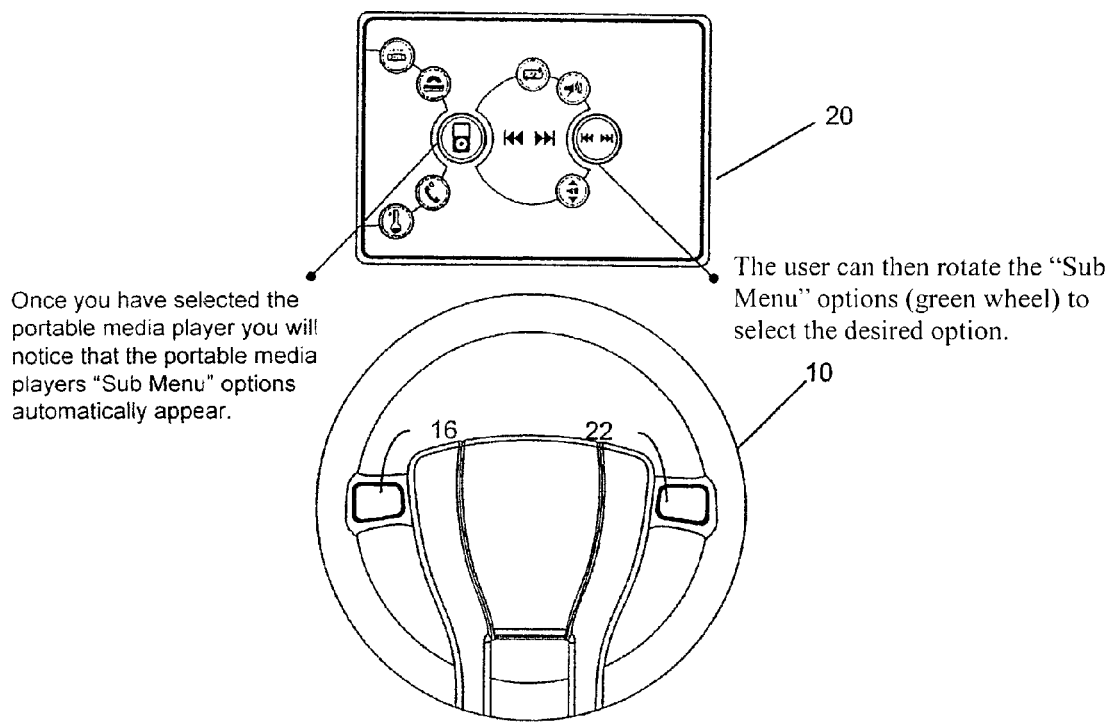
Figure 7E:
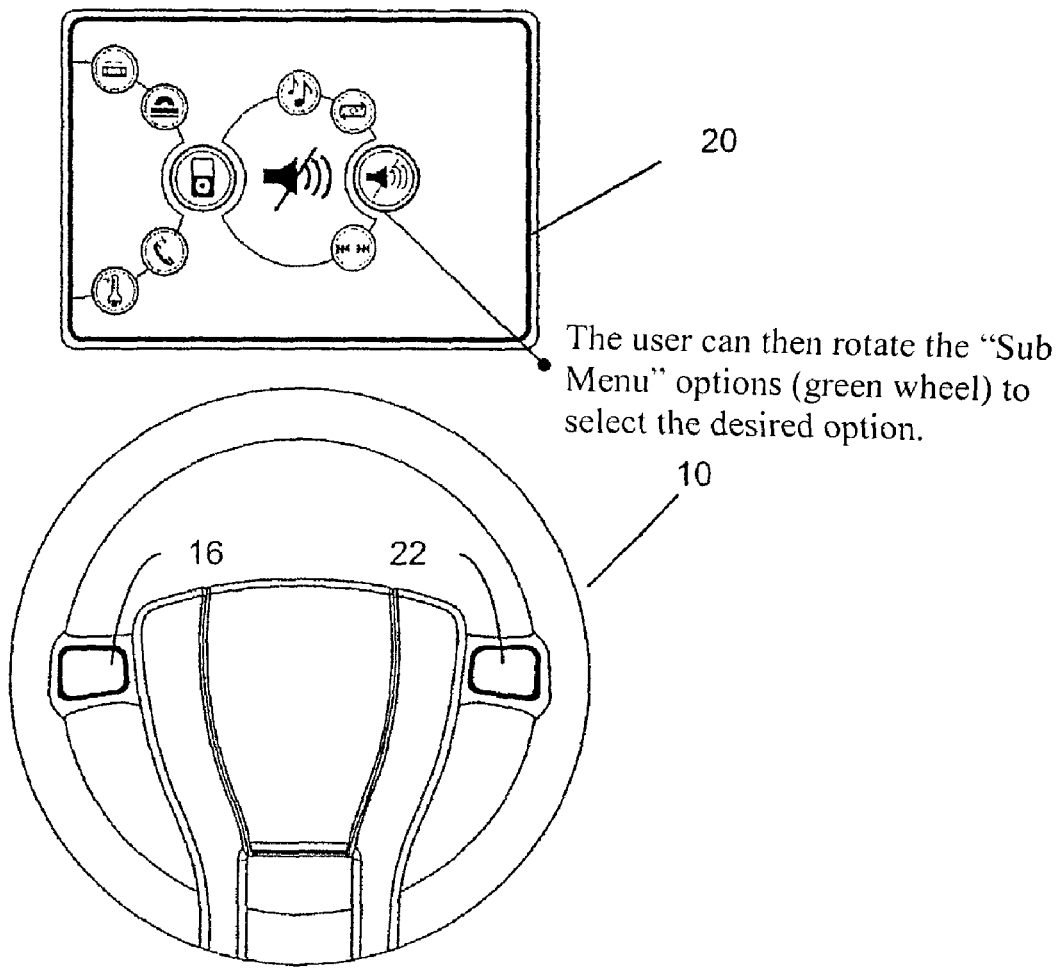
Figure 7F:
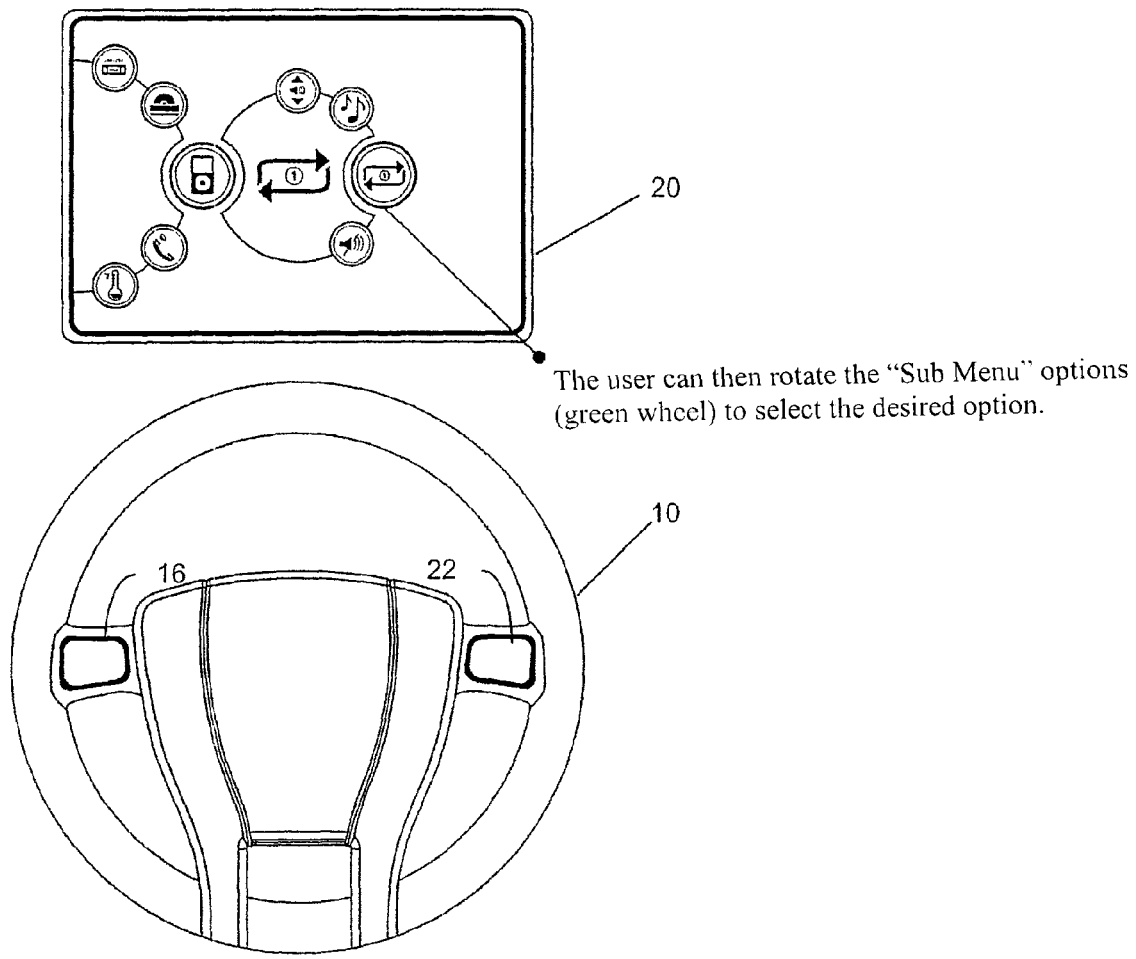
Figure 7G:
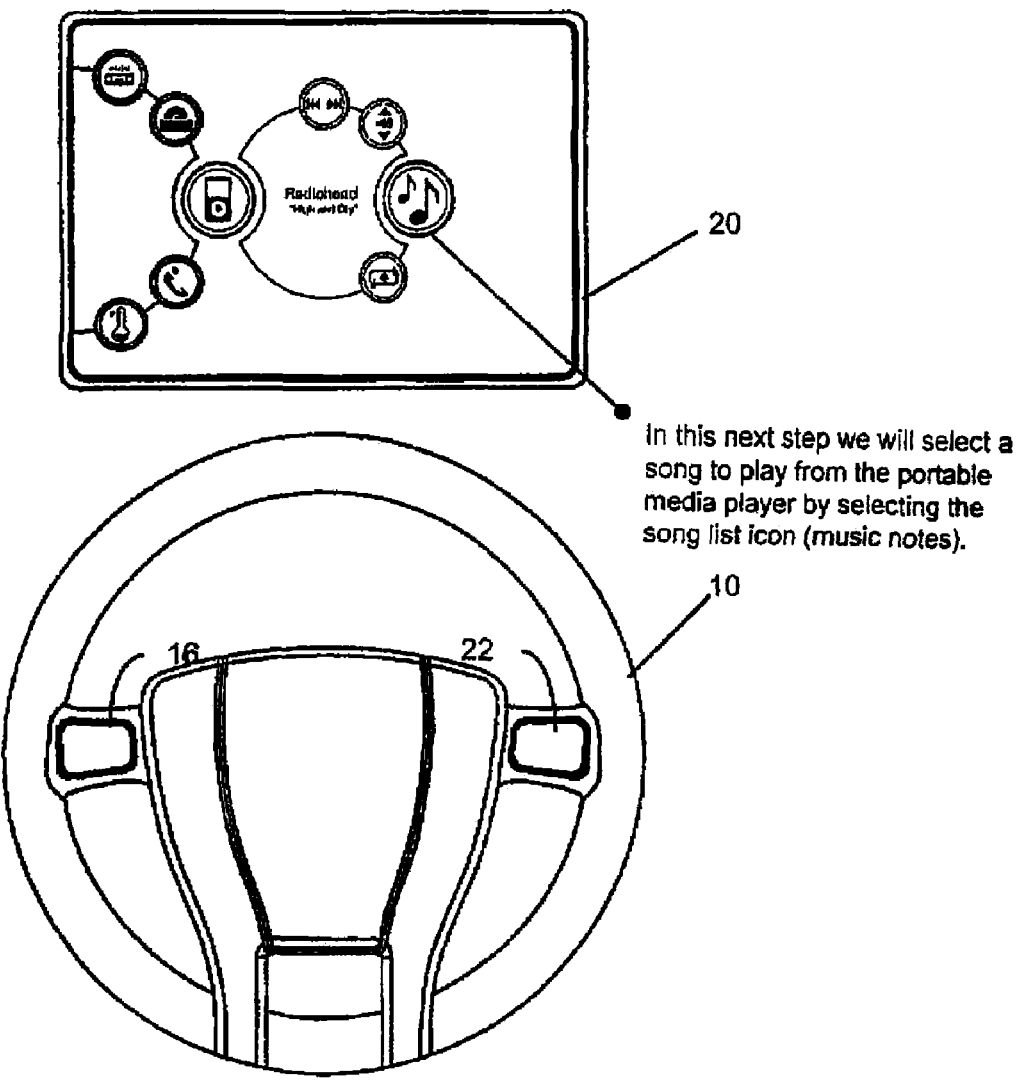
Figure 7H:
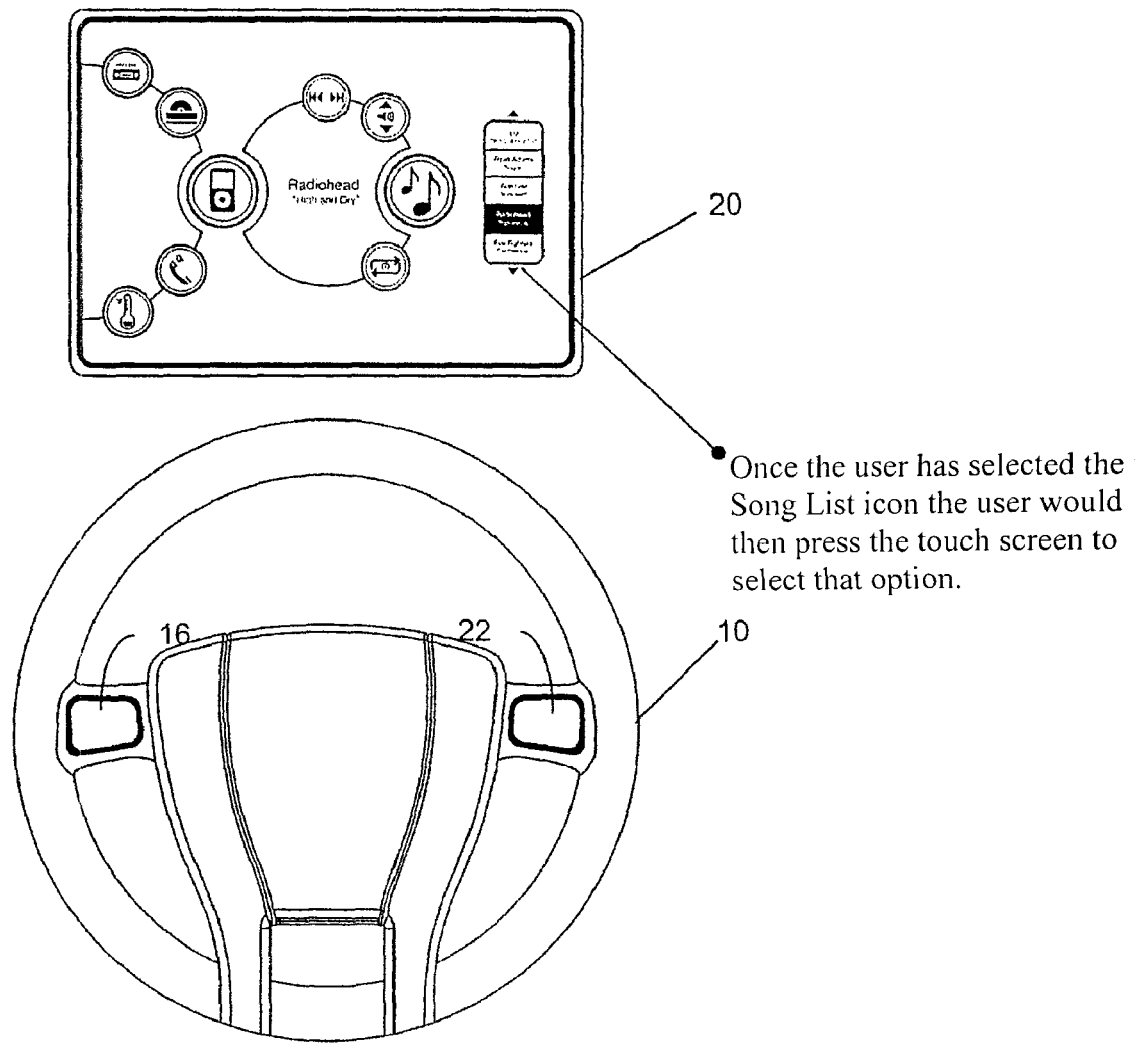
Figure 71:
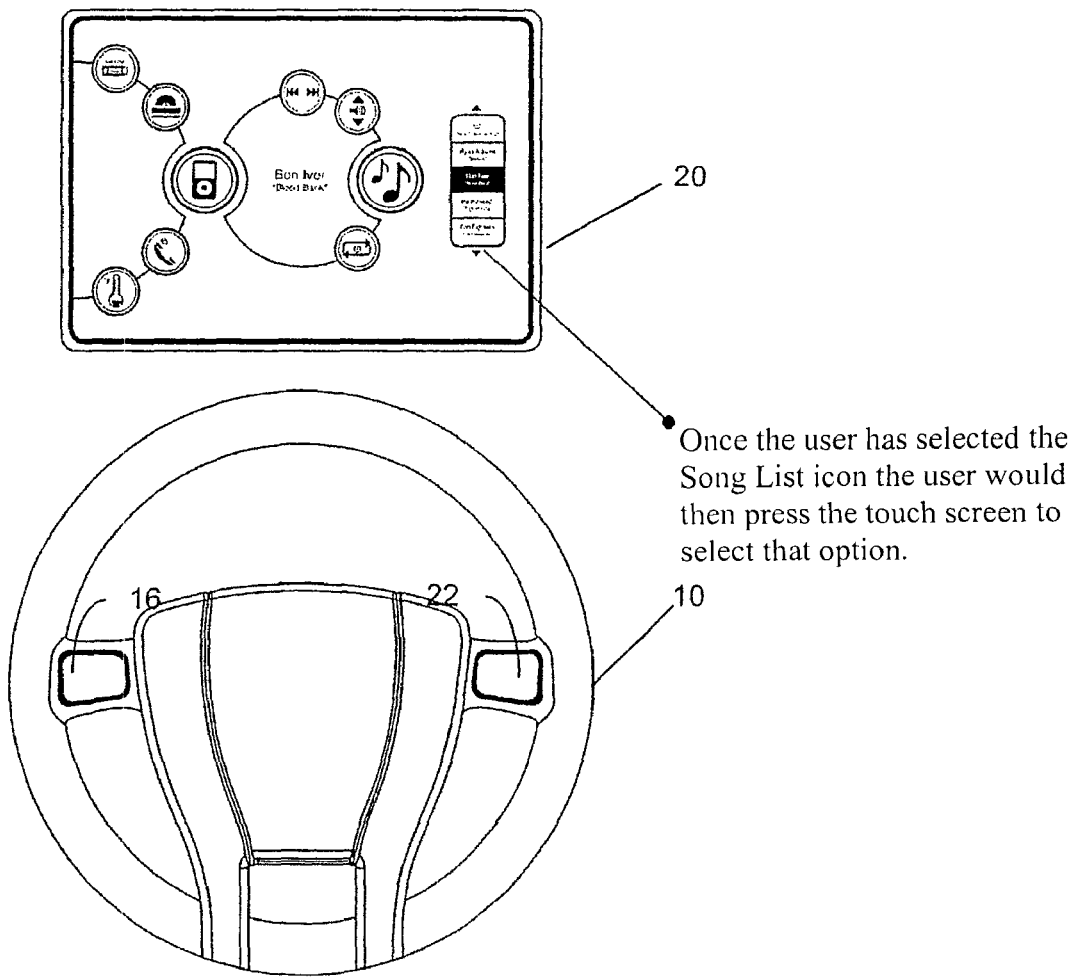
Figure 7J:
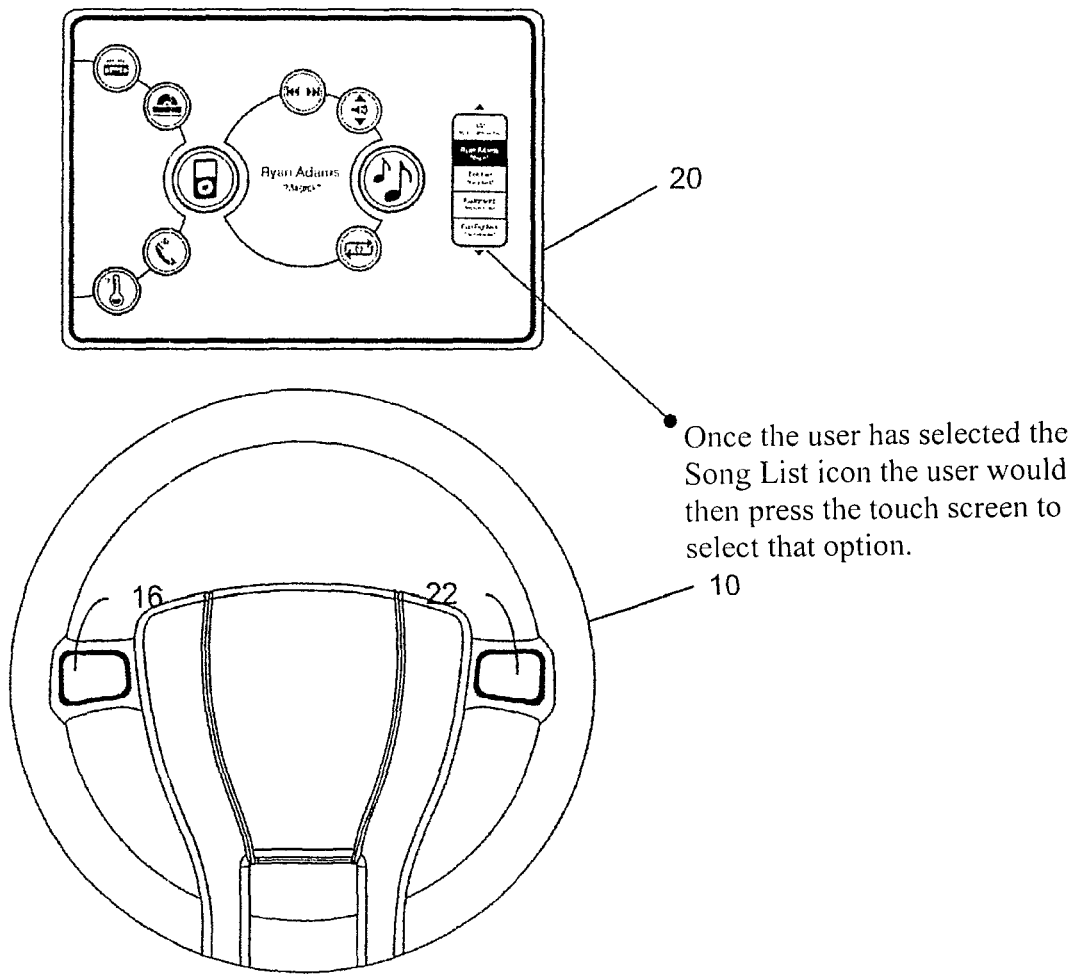
Figure 7L:
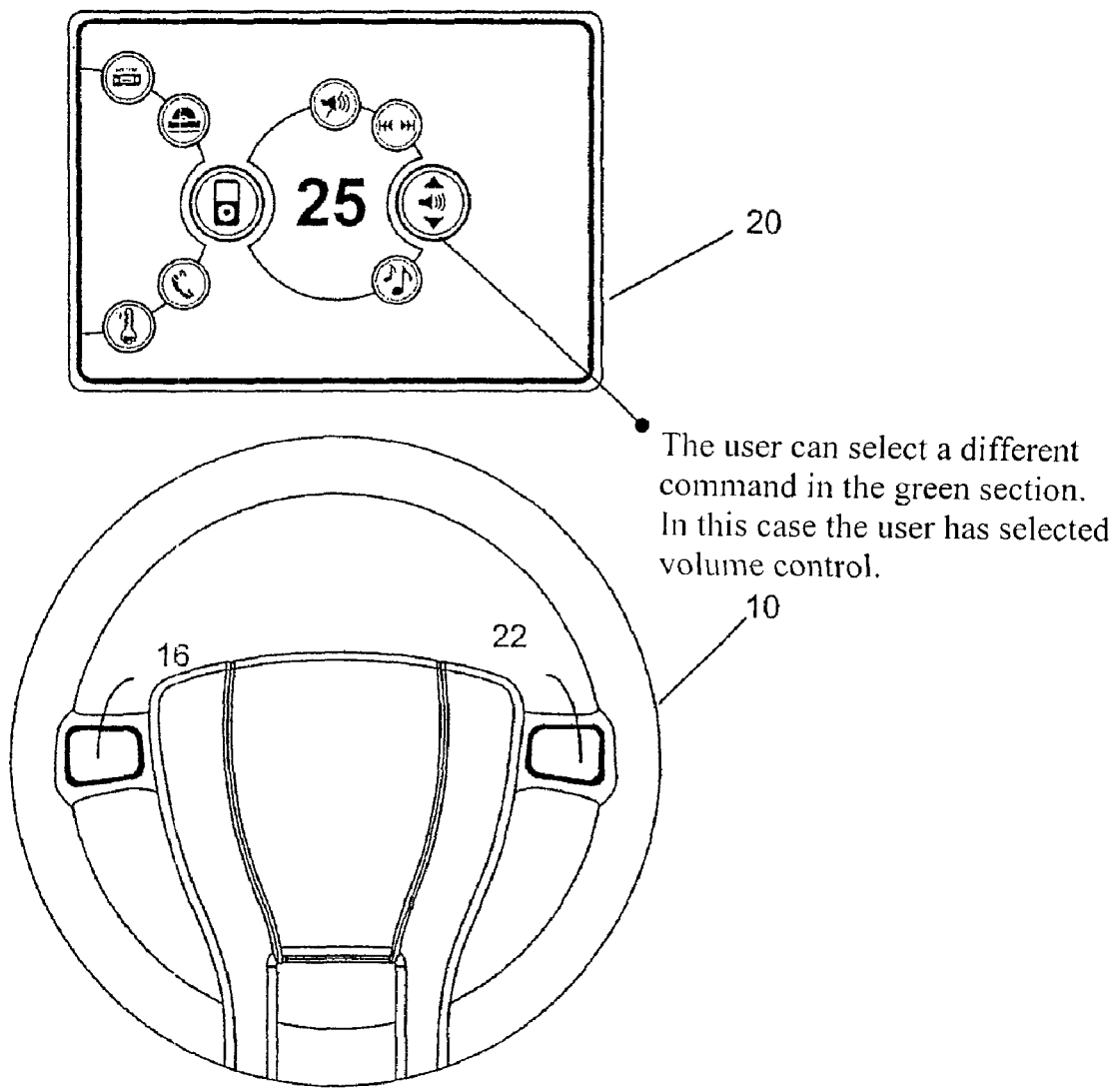
Figure 7M:
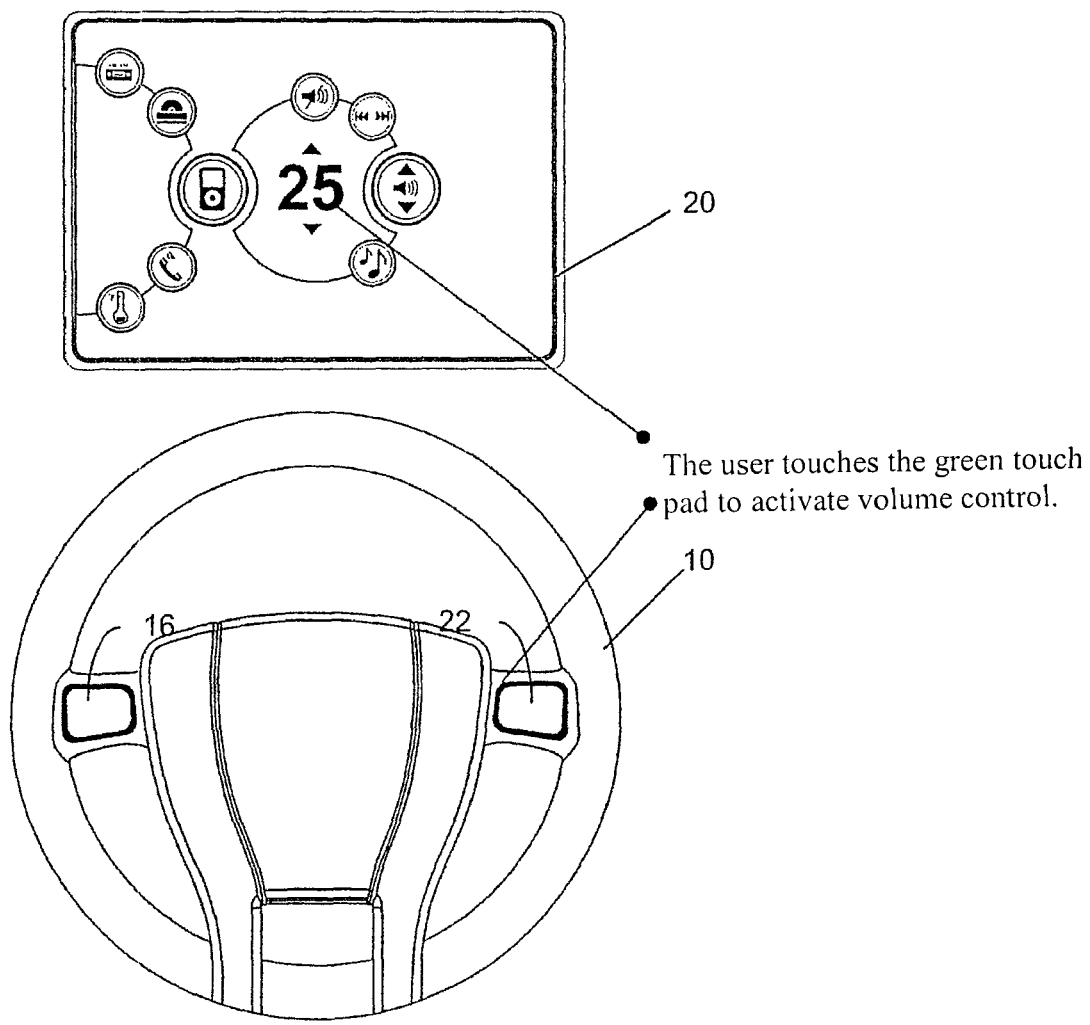
Figure 7N:
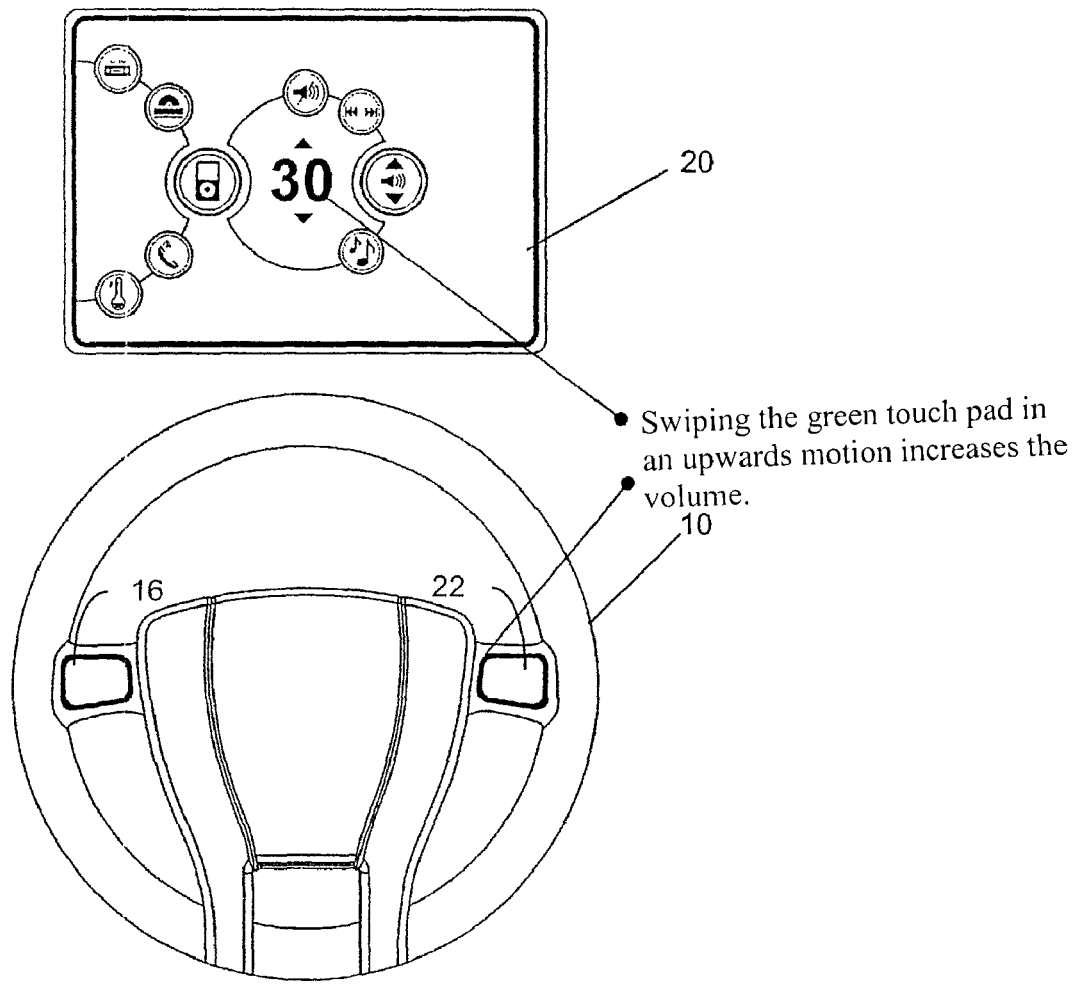
Figure 7O:
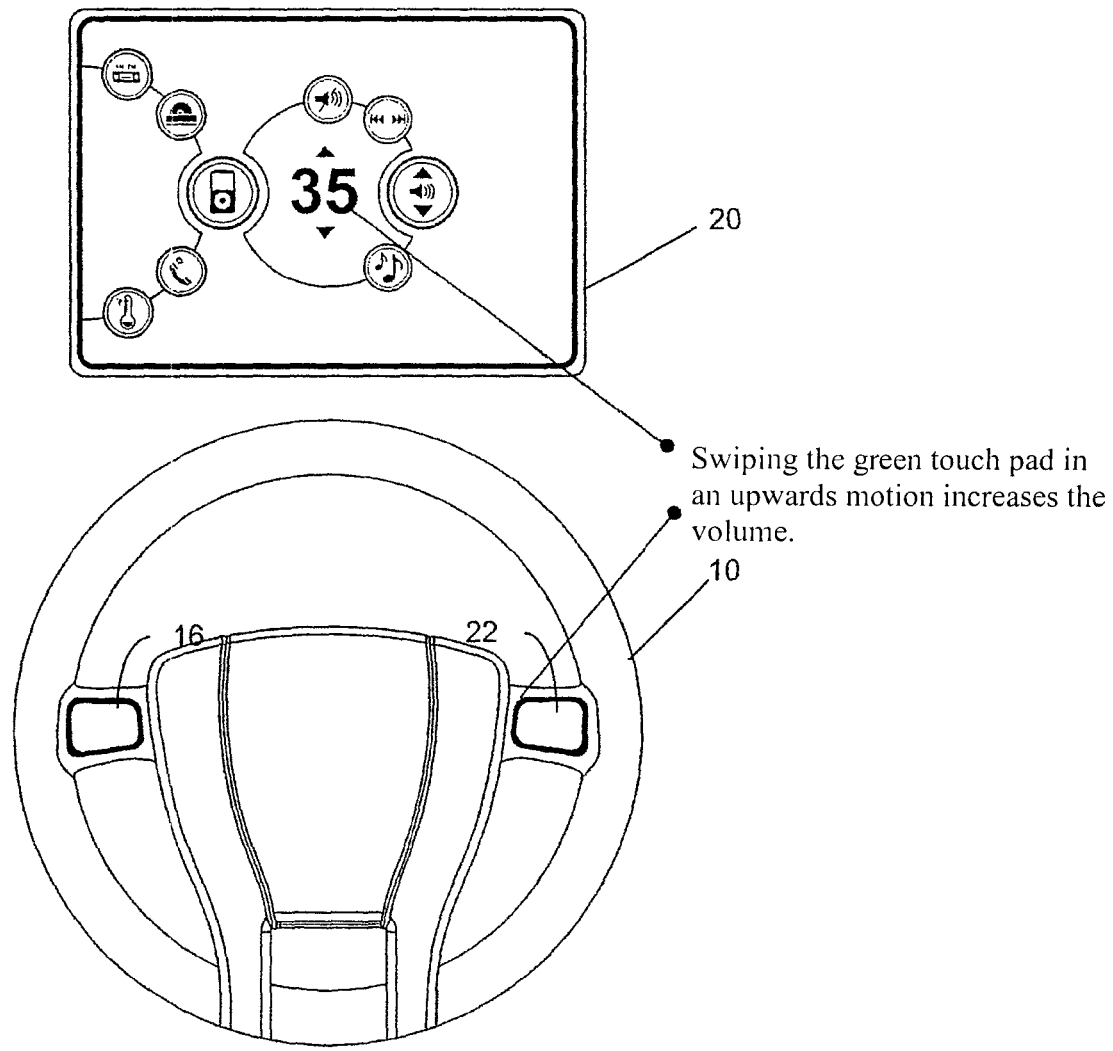
Figure 7P:
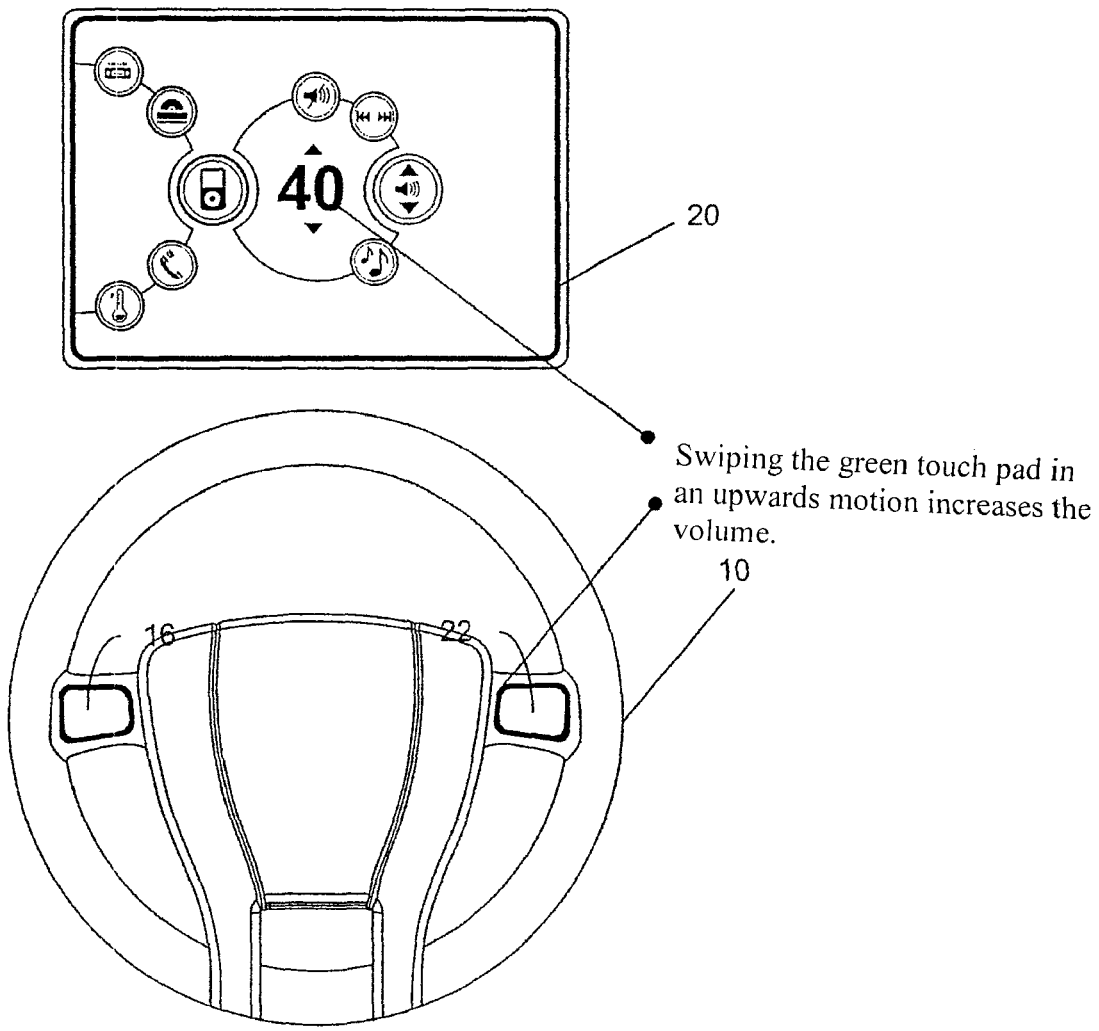
Figure 7Q:
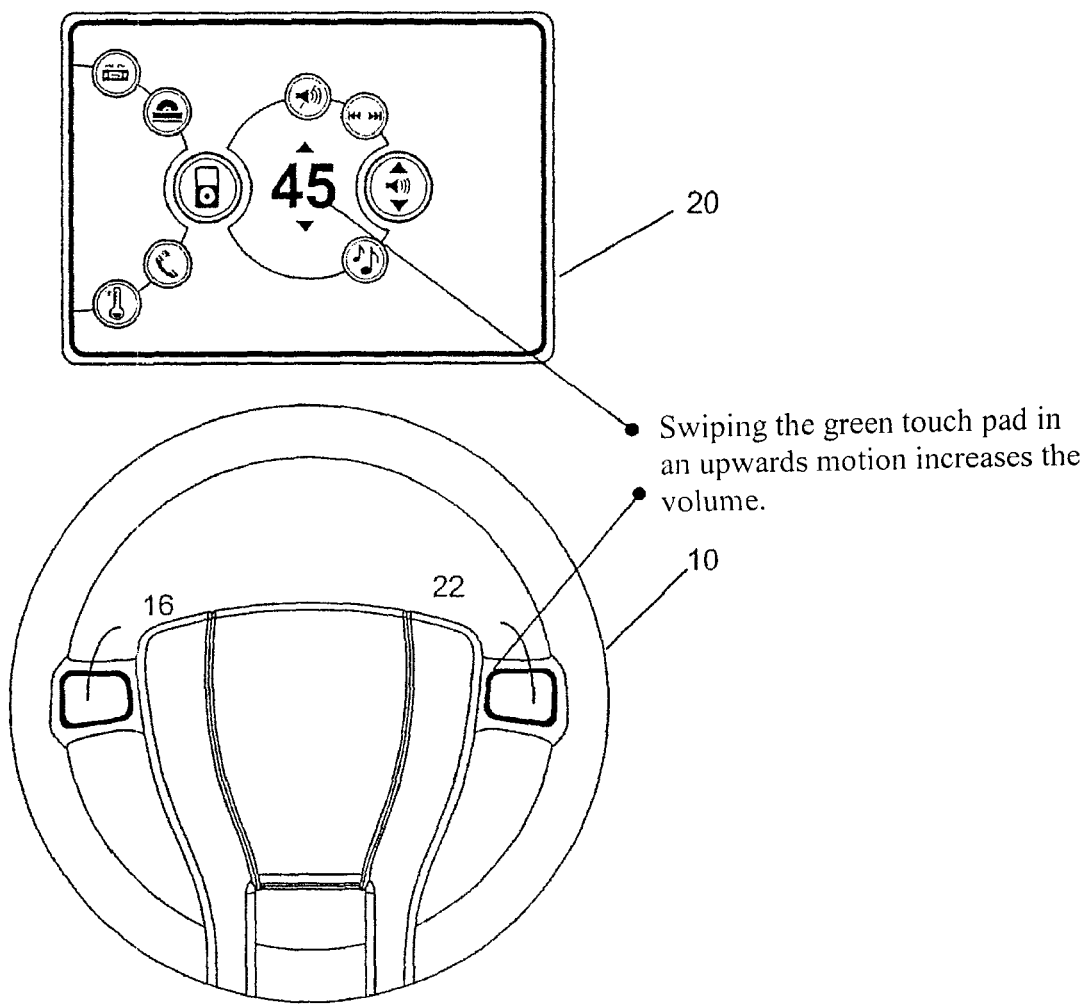
Figure 7R:
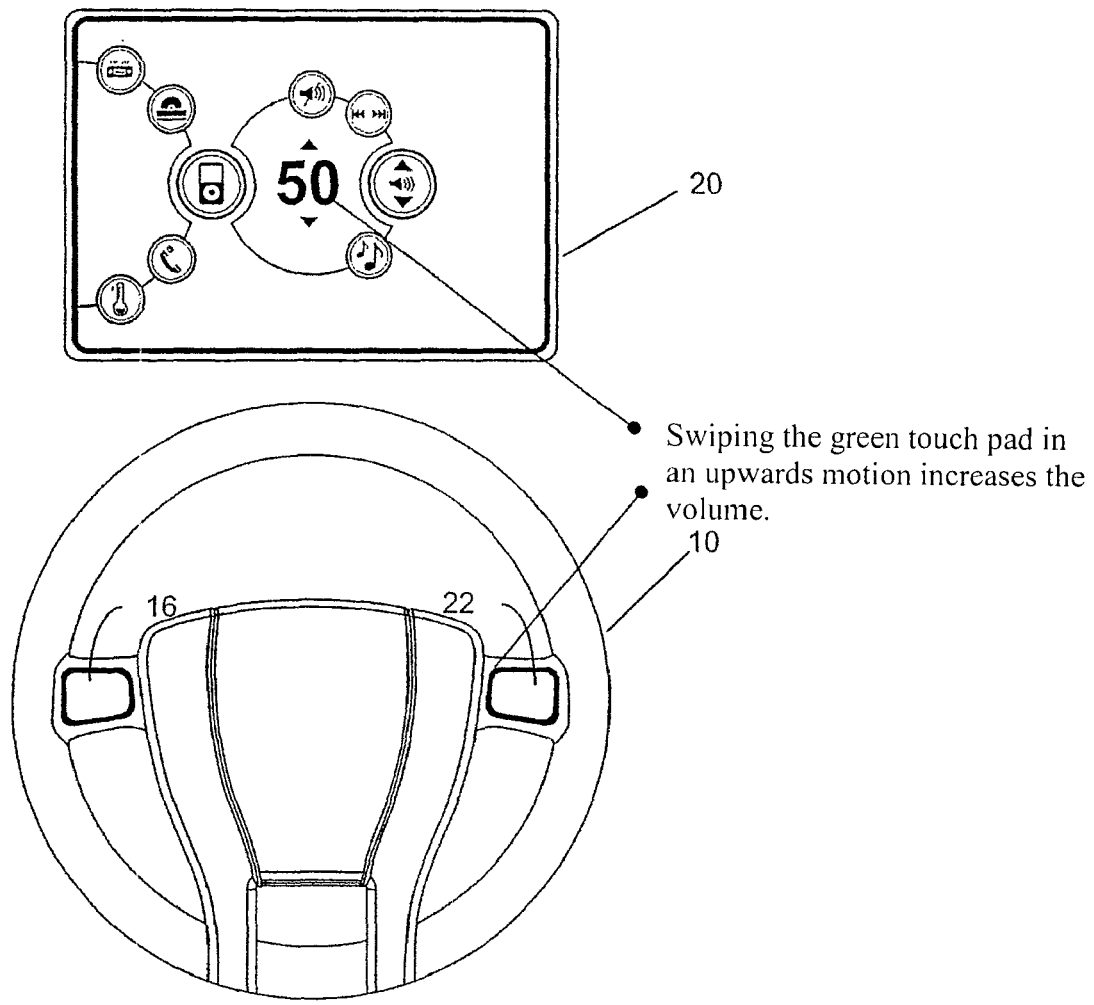

FIGS. 7A-7R depict illustrations of a user navigating a menu in order to make a menu selection using an embodiment of the present disclosure. The configuration depicted corresponds to FIG. 2. In FIG. 7A, the user swipes on the left side touchpad 16 and the selection menu appears on display 12. In FIG. 7B, the user flips through the menu by swiping up or down on the touchpad 16. In FIG. 7C, the user swipes up or down on the left side touchpad until he reaches the portable media player device. In FIG. 7D, the portable media player sub menu appears to the user. The user can then swipe on the right hand side touchpad 22 to navigate through the portable media player submenu, as seen in FIGS. 7E and 7F, until he navigates to the song list sub menu, as seen in FIG. 7G. At 7H, the song list is displayed to the user on the display 20. In FIG. 7I, the user selects the song by clicking on the right touchpad 22. The user may navigate back to the portable media player menu by clicking on the left touchpad 16, as shown in FIG. 7J. In FIG. 7K, the user chooses to control the volume of the actual portable media player device (and not the vehicle's volume). In FIG. 7L, the user clicks on the right touchpad 22 to activate the volume control. In FIGS. 7M-7R, the user swipes up on the right touchpad 22 to increase the volume until the user reaches the desired volume level.

The foregoing examples were meant to provide examples of a user interacting with the VUI system, and were in no way intended to be limiting.

Figure 3:
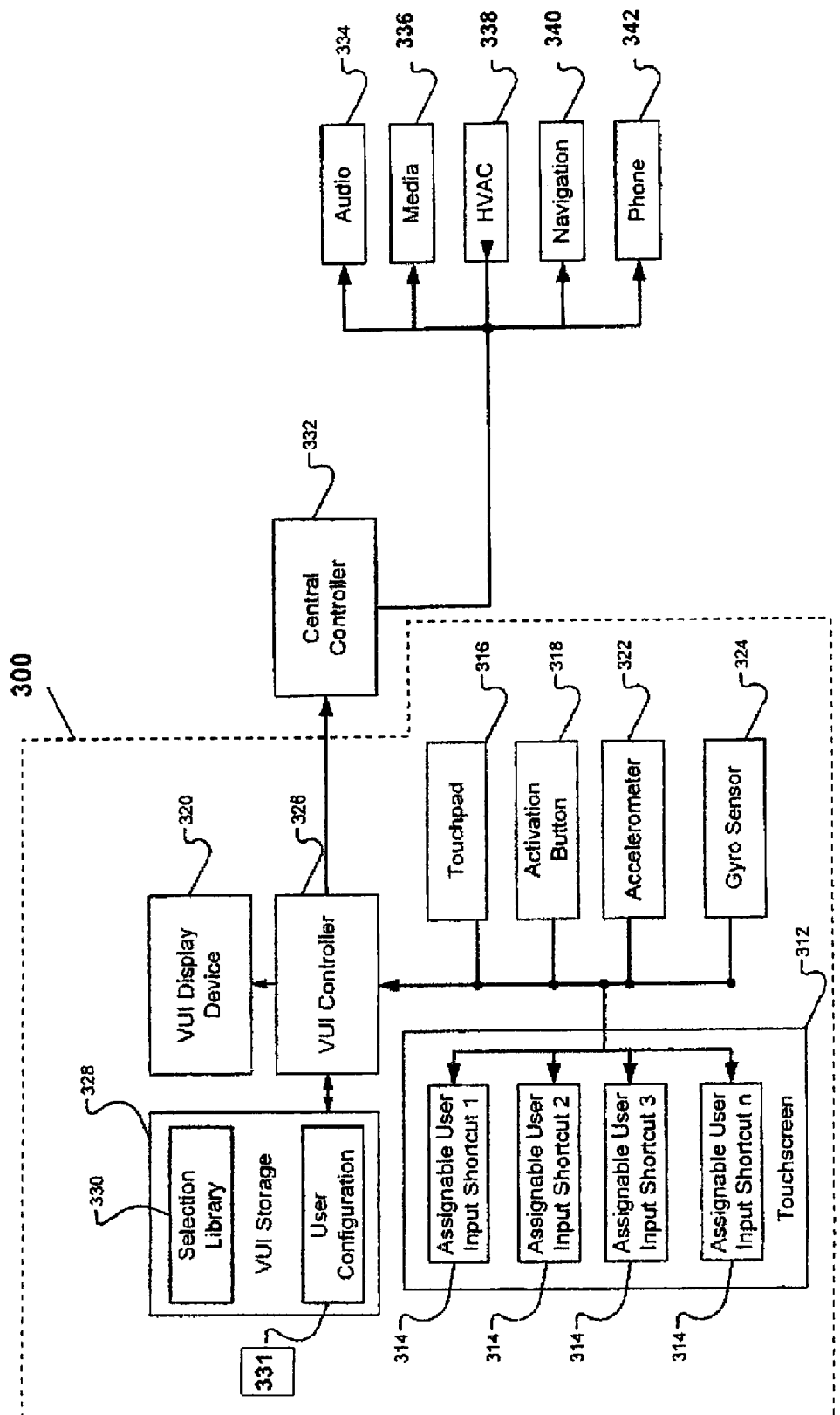
FIG. 3 illustrates an exemplary architecture of a vehicle user interface system.

As can be appreciated from the previous examples, the user input shortcuts on the steering wheel 10 interact with console controllers to achieve specific control functions, e.g. increase volume of audio system or alter the vehicles cabin climate. FIG. 3 provides an exemplary system architecture of the vehicle user interface system 300 in communication with a central controller 332 controlling a variety of devices 334-342 via a vehicle user interface controller 326. The vehicle user interface (VUI) system can include the components referenced in FIGS. 1 and 2. For example, the steering wheel 10 (FIGS. 1 and 2) of the vehicle may have a touch screen 312 displaying assignable user input shortcuts 314, a touchpad 316, and an activation button 318. The steering wheel 10 may also include an accelerometer 322 and/or a gyroscopic sensor 324. The exemplary VUI system 300 includes a VUI controller 326 which receives the user input and communicates with the central controller 332, which controls the variety of devices 334-342. The VUI controller 326 may also communicate with a VUI storage module 328. The VUI storage module 328 may store a selection library 330. In certain embodiments, a VUI display device 320 may display navigable menus to the user as well.

The VUI controller 326 is a central processing unit of the exemplary VUI system 300. As mentioned previously, the VUI controller 326 communicates with the different components of the steering wheel 10, as well as the VUI storage module 328 and the central controller 332. Thus, the VUI controller 326 is responsible for receiving a user command, via the touchpad 316 or touch screen 312 and communicating the command to the central controller 332. The central controller 332 receives a command from the VUI controller 326 and communicates the command to the appropriate device. For example, the VUI controller 326 may send a command to increase volume to the central controller 332. The central controller 332, in turn, communicates a corresponding command to the vehicle's audio system 334. It is envisioned that the VUI controller 326 may be electrically, optically, or wirelessly coupled to the central controller 332.

In the exemplary embodiment, the assignable user input shortcuts 314 will each display an icon or an input option. The display of the icons may be such that the touch screen 312 resembles a set of traditional electromechanical input buttons. Thus, there may be distinct lines displayed on the touch screen separating each user input shortcut 314. The user may select a user input, e.g. by making contact with or forcibly pressing one of the user input shortcuts 314. A signal or output indicative of the user selection will then be communicated to the VUI controller 326. In some embodiments, the user may customize the configuration of the user input shortcuts 314, such as which shortcuts are displayed on the touch screen 312, the locations of the icons on the touch screen 312, the size of the icons on the touch screen 312, and the amount of icons on the touch screen 312. The VUI controller 326 receives the user configuration 331 from the VUI storage module 328 and displays the user input shortcuts according to the user configuration 331.

In some embodiments, the signal may be indicative of the location of user contact. In this case the VUI controller 326 may receive the location of the user input and look up the mapping of the location to a specific control function in the VUI storage module 328. For example, the location indicating the top shortcut may be mapped to increasing the volume. Thus, when the VUI controller 326 receives an input or signal indicating that the user has activated the sensors of the top shortcut, the VUI controller 326 can query the VUI storage module 328 with the location of the sensor, i.e. top shortcut, and receive the command for increasing the volume. The VUI controller 326 may then communicate the command for increasing the volume to the central controller 332. In other embodiments, the touch screen 312 may be configured to transmit the actual command, e.g. increase volume, to the VUI controller 326. In this case, the VUI controller 326 will receive the command and communicate the command to the central controller 332.

Figure 4:
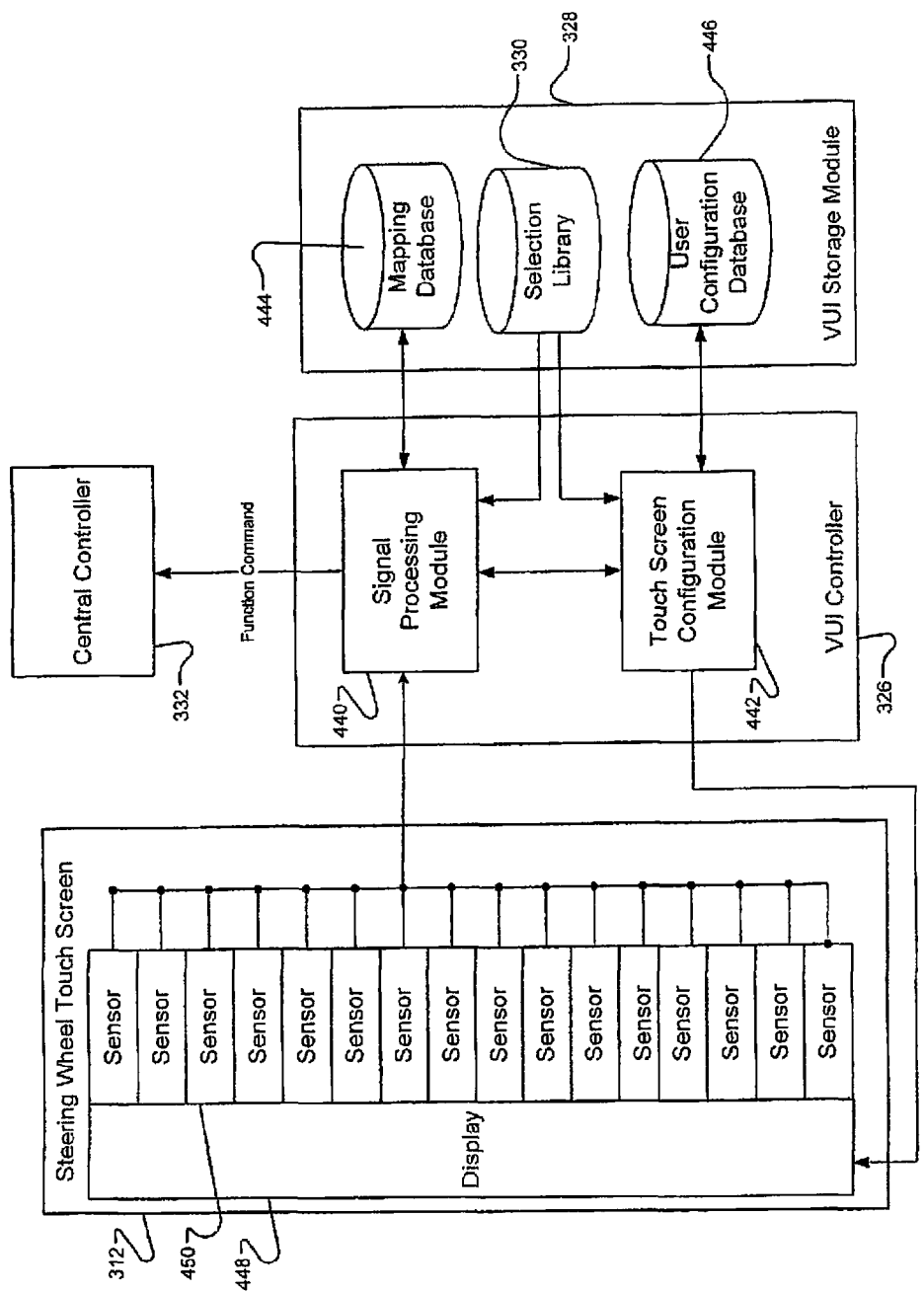
FIG. 4 illustrates an exemplary architecture of a vehicle user interface system as it relates to the touch screen of said interface system.

FIG. 4 provides a more detailed view of the relationship between the touch screen 312, the VUI controller 326, and the VUI storage module 328. As can be seen in the figure, the touch screen 312 may have a touch screen display 448 overlaid a plurality of touch sensors 450. Each of the sensors 450 generates a signal upon being touched indicating that contact was sensed and the location of the sensor 450. The signal may be communicated to a signal processing module 440 associated with the VUI controller 326. The signal processing module 440 may be in communication with a mapping database 444 stored in the VUI storage module 328. The mapping database 444 may be a table indicating the mappings from specific locations on the touch screen to particular function commands. Thus, when signal processing module 440 receives a signal, signal processing module 440 will determine the location of the activated signal, and query the mapping database 444 using the location. The mapping database 444 will return the function command corresponding to the location. Signal processing module 440 may then query the selection library to determine a signal to transmit to the central controller 332, wherein the signal corresponds to the selected function command.

Touch screen configuration module 442 communicates with the touch screen display 448 to display the icons of the user input shortcuts. Touch screen configuration module 442 reads a configuration file from a user configuration database 446 indicating a user's desired configuration. The configuration may indicate an amount of user input shortcuts to display on the touch screen display 448, the size of each user input shortcut, the location of each user input shortcut, and the mappings of each of the locations of the user input shortcuts to the respective function commands of the user input shortcuts. Touch screen configuration module 442 may also receive icons or visual indicators for each of the control functions from the selection library 330, so that the icon may be displayed to the user on the display of the touch screen 312. As will be described below, the configuration of the touch screen is reconfigurable by the user. The touch screen configuration module 442 can, thus, receive a modified configuration file to display the user input shortcuts in accordance with the user's preferences.

In some embodiments, the signal processing module 440 and the touch screen configuration module 442 may be in communication. For example, the user may press a particular user input shortcut. The signal processing module 440 may communicate the event to the touch screen configuration module 442, which in turn can alter the display of the touched user input shortcut, thereby indicating to the user that the input was received.

Figure 9:
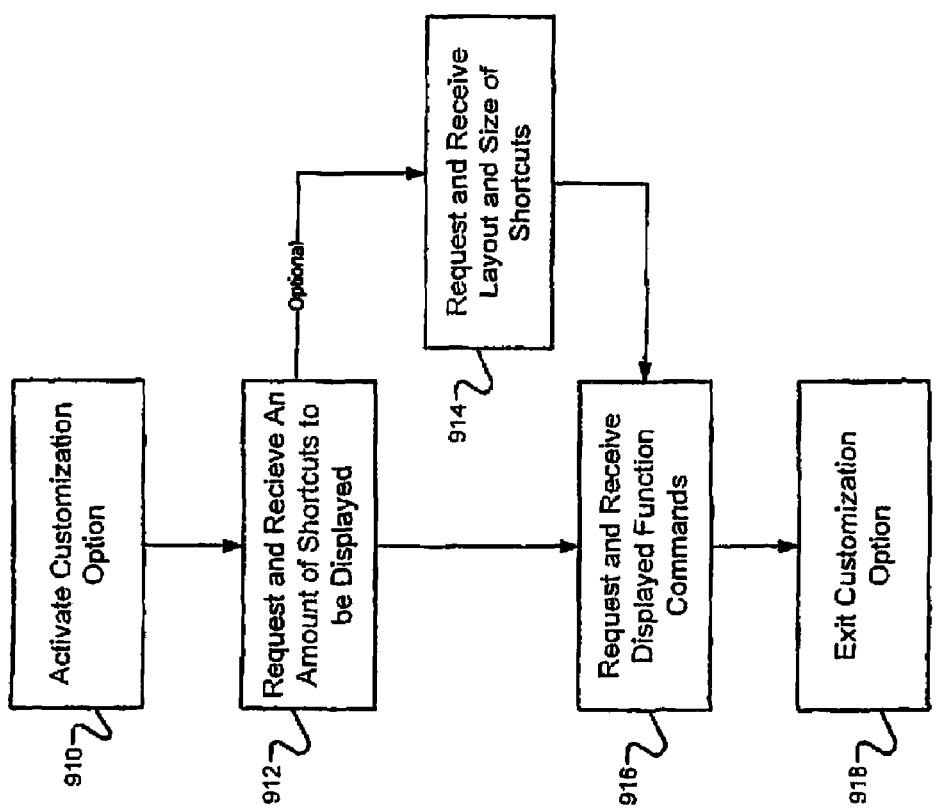
FIG. 9 illustrates an exemplary method for changing the configuration of the user input shortcuts of the vehicle user interface system.

As previously mentioned, a user can customize the assignable user input shortcuts 314 (FIG. 3). FIG. 9 depicts an exemplary method for customizing the assignable user input shortcuts. In some embodiments, a configuration file is stored in the VUI storage module 328. The configuration file may indicate an amount of user input shortcuts displayed at a time, the size of each user input shortcut, and the icons displayed in each user input shortcuts. Thus, when the user customizes the user input shortcuts 314 on the touch screen 312, the configuration file is modified by the VUI controller 326 and then stored in the user configuration database of the VUI storage module 328. It is envisioned that an original settings file may also be stored, so that the user may reset the configuration to its original settings. Further, the VUI module 328 may store configuration files for a plurality of users, so that when different users use the vehicle, the VUI controller 326 will load the configuration file of the user driving the car and the touchpad will be display that specific user's customization settings.

At step 910, the user enters into the customization option. This step can occur when the user first buys the vehicle or at any point during the lifetime of the vehicle. In some embodiments, the customization option can only be entered when the car is in park or not moving. In embodiments where there is a dedicated display unit 320 for the VUI system, a graphical user interface may be used to reach this option, e.g. the user may scroll through a settings menu to reach the customization option. In other embodiments, the user may enter the configuration option by holding the activation button 318 or using a menu on the center console. It is envisioned, however, that any means of entering a customization option may be used.

Once in the customization option, the user can select the number of user input shortcuts 314 to display on the touch screen 312 at step 912. The prompt may be displayed on the dedicated display device 320, may be given by an automated voice prompt, or displayed on a display associated with the central console. The user will then enter the amount of shortcuts to be displayed. The user may enter the number via the touchpad, e.g. by scrolling through a predetermined set of integers 1-n, via voice command, or any other means of inputting a number. The system may provide audio and/or visual feedback to the user. At this point, the user's configuration file may be updated to indicate the amount of user input shortcuts to be displayed. An exemplary method for determining an amount of user input shortcuts is illustrated in FIGS. 13A-13G, as described above.

Figure 10:
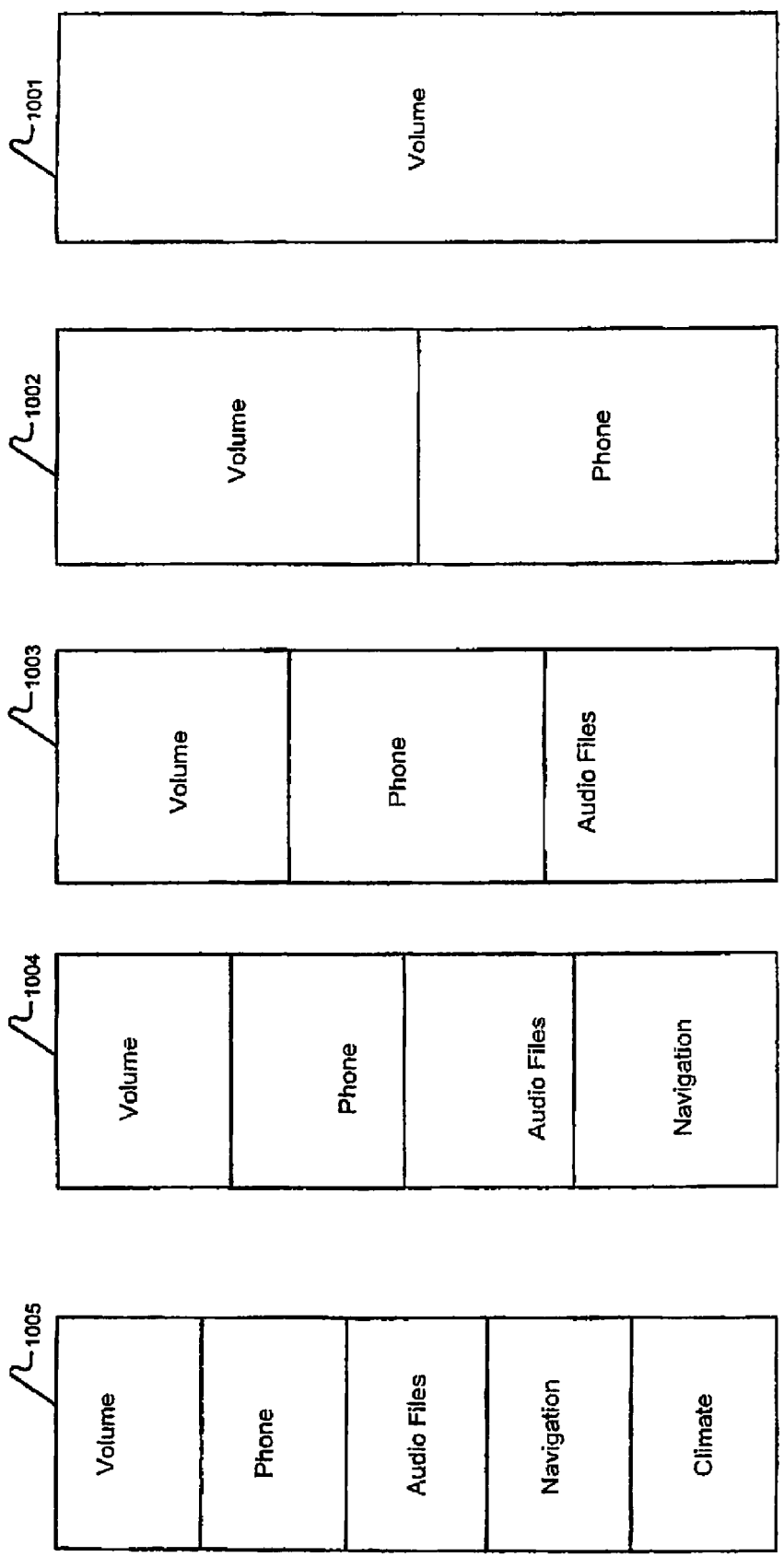
FIG. 10 illustrates an example of different layouts of the user input shortcuts of the vehicle user interface system.

At optional step 914 the user can elect to further alter the layout of the touch screen 312. It is envisioned that if a user forgoes this step, or if this step is not offered, the VUI controller 326 will display the user input shortcuts in predetermined sizes. That is, if the user selects the number five, the touch screen 312 will display five equally sized user input shortcut buttons, if the user selects the number four, the VUI controller 326 will display four equally sized user input shortcut buttons. FIG. 10 depicts configurations of five 1005, four 1004, three 1003, two 1002 and one 1001 equally sized shortcuts. In other embodiments, there may be a set number of user input shortcuts 314 displayed, where if the user selects a number less than the set shortcuts, a subset of the shortcuts 314 are left blank and unmapped to a control function.

Figure 11:
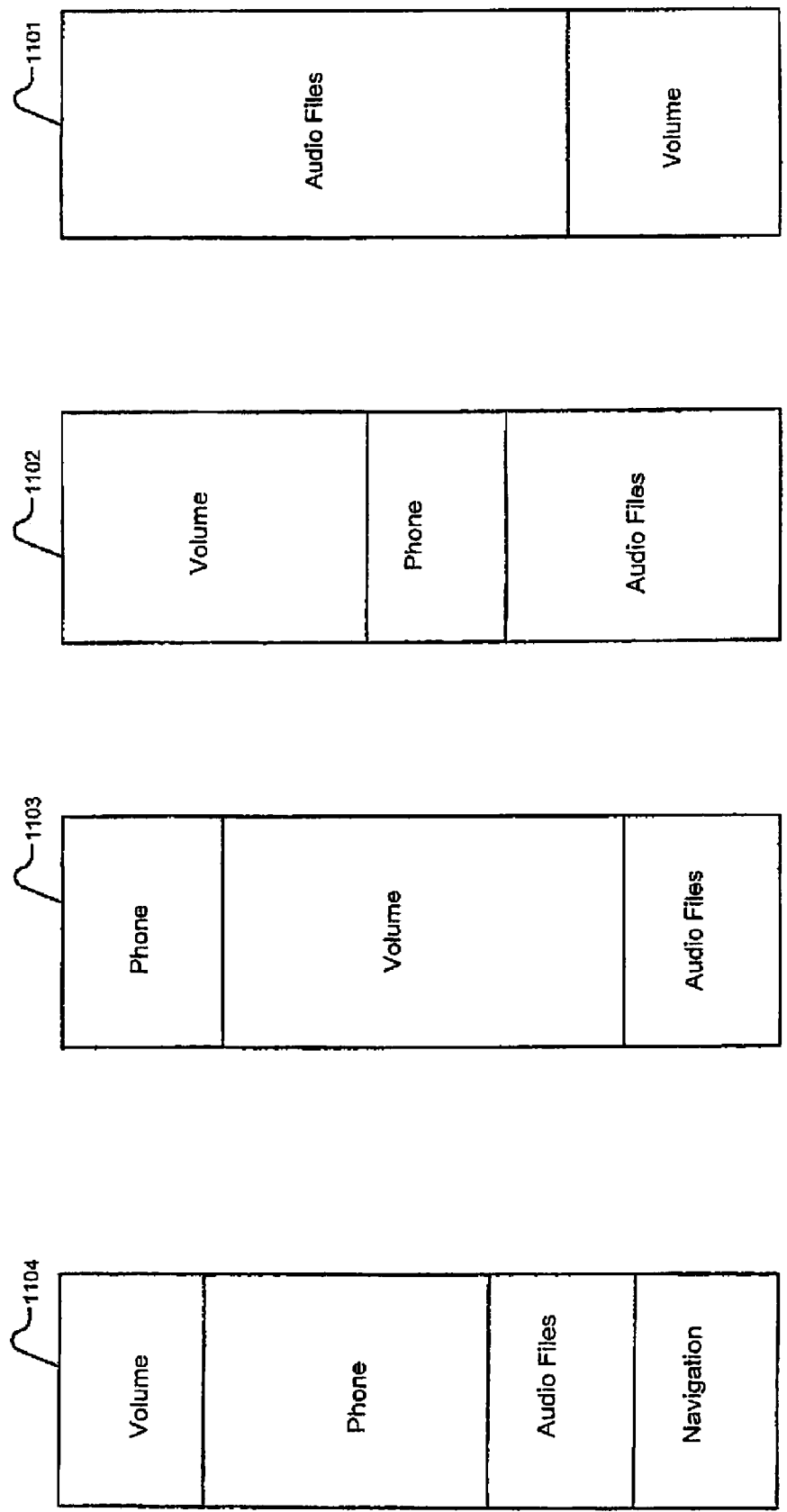
FIG. 11 illustrates an example of different layouts of the user input shortcuts of the vehicle user interface system.

If optional step 914 is enabled and selected, the user will then be allowed to enter the exact configuration of the user input shortcuts 314. FIG. 11 illustrates possible configurations of the user input shortcuts 314, as displayed by the touch screen 312. As can be appreciated from the figures, in configuration 1104, the user has selected three smaller shortcuts and one larger shortcuts. In configuration 1103, the user has selected two smaller shortcuts and one very large shortcut in the middle. In configuration 1102, the user has selected one smaller shortcut, one larger shortcut and one very large shortcut. In configuration 1101, the user has selected one very large shortcut and one small shortcut. It should be appreciated that the examples provided in the figures are in no way limiting of the different configurations that may be implemented. An exemplary method for determining a size of user input shortcuts is illustrated in FIGS. 14A-14G, as described above.

The user can select the sizes of the shortcuts in a number of ways. The user may be prompted to select the sizes of each input shortcut. For example, the user may be prompted to select the size from a set of predetermined shortcut sizes. In these embodiments, the VUI controller 326 will store the user selection in the VUI storage module 328. The user may select the sizes of each of the shortcuts. Alternatively, the user may be allowed to enter the sizes manually by swiping his or her finger along the touch screen so as to define the boundaries of each shortcut. In this embodiment, the exact locations of the top and bottom boundaries of each user input shortcut is stored in the configuration file of the user. In some embodiments, the user may select from a plurality of predetermined layouts. The dedicated display unit 320 may display the plurality of layouts and the user may use the touchpad 316 to scroll through the layouts and select a desired layout. Other exemplary layouts are illustrated in FIG. 15, as described above.

Figure 12:
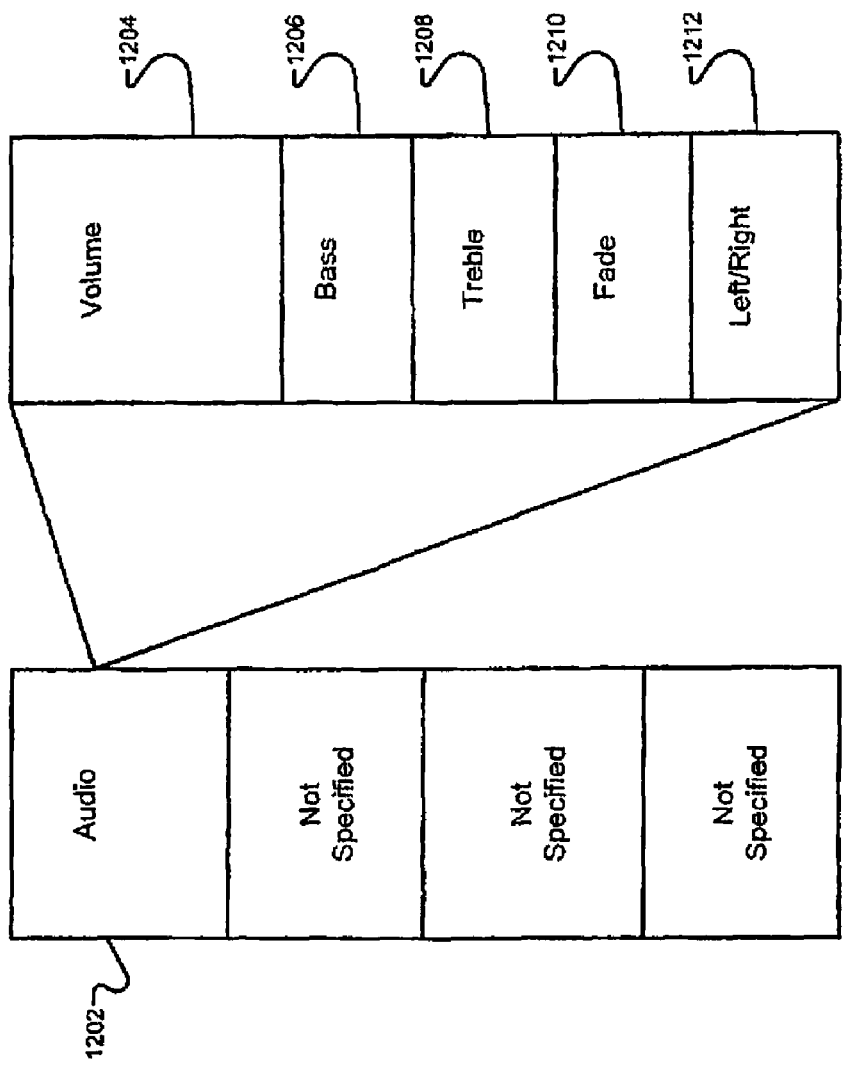
FIG. 12 illustrates an example of selecting function commands for particular user input shortcuts of the vehicle user interface system.

Once the user has selected the amount of icons to be displayed and possibly the configuration of the user input shortcuts, the user may then select the actual user input shortcuts. The user may select the shortcuts from the selection library. The VUI system 300 may be configured in different ways to allow the user to make this selection. The user may scroll through a list of icons/function commands and assign desired command functions to each user input shortcut. If the menu is set up in a tree like structure, i.e. the user selects a category of commands, then moves down to select an actual function command or another subcategory, the user may configure the subcategory menu further or select the control functions at the lower level. For example, FIG. 12 depicts a two level menu where the user has selected "Audio" as the first category shortcut 1202. In the top level menu, the user has only selected four categories shortcuts to be displayed. As can be appreciated, the user has set the second level of audio to contain five controls, where the top user input shortcut 1204 is displayed as the larger, and the remaining user input shortcuts 1206-1212 are smaller. The user has selected "Volume" at the first user input shortcut 1204, "Bass" at the second user shortcut 1206, "Treble" at the third user input shortcut 1208, "Fade" at the fourth user input shortcut 1210, and "Left/Right" at the fifth user shortcut 1212. The VUI controller 326 may store the user's selections in the configuration file associated with the user and write the updated configuration file into the VUI storage module 328. In some embodiments, the user may configure a portion of the controls, in which case the VUI controller 326 may automatically configure the remaining user input shortcuts according to the initial settings or any other method.

Once the user has finished configuring a user input shortcut 314, the VUI controller may insert a mapping of the location of the user input shortcut 14 to the selected control function. This mapping may be stored in the user configuration file of the VUI storage module 328.

Although the method in FIG. 9 has been described with respect to assignable user input shortcuts displayed on the touch screen 312, it is envisioned that the assignable user input shortcuts may be displayed on the display unit 320 itself, wherein the user input shortcuts are selected using one or more touchpads 316.

Referring back to FIG. 3, the steering wheel 10 may further include a touchpad 314 for changing controlled values such as volume, radio stations, brightness of interior lights, temperature, and fan speed. The user may select a control value, e.g. volume, from the user input shortcut 314, and then swipe the touch pad up or down to control the volume. The touchpad sends the signals to the VUI controller 326, which in turn is communicated to the central controller 332. Although one touchpad is referenced, it is appreciated that more than one touchpad may be used. For example, two touchpads may be placed on the steering wheel, one on the right side of the steering wheel 10 and one on the left side of the steering wheel 10.

As mentioned, the VUI controller 326 can communicate with the VUI storage module 328. The VUI storage module 328 may be volatile or non-volatile memory for storing the user configurations 331, i.e. the assigned tasks for the assigned user input shortcuts 314, as well as the set of all tasks that are available for assignment to the assignable user input shortcuts, i.e. the selection library 330. The VUI storage module 328 may also store additional user input shortcut data for each of the shortcuts, such as a visual icon, a audio and/or visual feedback notification corresponding to the shortcut, and a command to be sent to the central controller 332. The VUI storage module 328 may also include a lookup table that maps the current locations of the user input shortcuts 314 to the control function of the displayed shortcuts. Further, the command that the VUI controller 326 communicates to the central controller 332 may also be stored in the VUI storage module 328. Other data that may be stored in the VUI storage module 328 may include any audio or visual alerts that are associated with the displayed user input shortcuts.

The selection library 330 of an exemplary embodiment stores the collection of user input shortcut data. As such, the selection library 330 contains the user input shortcut data for all possible user input shortcuts, as opposed to only the user input shortcut data corresponding to the displayed user input shortcuts 314. It is envisioned that the selection library is preloaded into the VUI storage module 328. As mentioned earlier, and described below, the user may configure the user input shortcuts 314 to his or her specification. Accordingly, user input shortcut data corresponding to the user preferences may be stored in a user configuration database of the VUI storage module 328, while the entire collection of the user input shortcut data is stored in the selection library 330. As mentioned earlier, user input shortcut data may include, but is not limited to, a control function to which the user input shortcut maps to, a visual icon corresponding the user input shortcut, a audio and/or visual feedback notification corresponding to the user input shortcut, and a signal that is communicated to the central controller 332 corresponding to the user input shortcut.

Furthermore, the selection library 330 may be updated when a user adds a new device. Thus, when a user adds an after market device to the vehicle, the user may have a shortcut button 314 on the steering wheel 10 corresponding to the new device. When a new device is added, the VUI controller 326 may read user input shortcut data from the new device's drivers or related software, firmware and/or middleware. Alternatively, if the vehicle has a means of connecting an external or removable devices, such as a USB port or Bluetooth, the user input shortcut data may be downloaded to the selection library via the USB or Bluetooth. It is envisioned that other means of downloading the user input shortcut data may be used as well, such as WiFi, WiMax. Also, a user may use forms of removable storage, such as CD or DVD to update the user input shortcut data.

The following shows an example of XML code snippets of various tasks that may be stored in the selection library. It is appreciated that the files referenced by the XML code may also be stored in the selection library 330, or elsewhere in the VUI storage module. As can be seen, each task may have, for example, the task name, the file containing the icon, the command, and an audio feedback file.

```
<VUISelectionLibrary>
//Control Radio Volume
<task>
    <cmd id="radio_volume">
        <audio>volume.wma</audio>
        <icon>volume.ico</icon>
        <CentralConsoleCommand>
            <volume>
                <value>25</value>
            </volume>
        </ CentralConsoleCommand >
    </cmd>
</task>
// Answer Phone
<task>
    <cmd id="answer_phone">
        <audio>beep.wma</audio>
        <icon>phone.ico</icon>
        < CentralConsoleCommand >
            <phone>
                <value>yes</value>
            </phone>
        </ CentralConsoleCommand >
    </cmd>
</task>
// Circulation Phone
<task>
    <cmd id="circulate">
        <audio>circulate.wma</audio>
        <icon>circulate.ico</icon>
```

-continued

```
        < CentralConsoleCommand >
            <circulate>
                <value>on</value>
            </circulate>
        </ CentralConsoleCommand >
    </cmd>
</task>
</VUISelectionLibrary>
```

It should be appreciated that the foregoing is provided for exemplary purposes only, and is in no way limiting.

The steering wheel 10 may also include an activation button 318. The activation button 318 can communicate with the VUI controller. The activation button 318 may be used to switch between displays on the touch screen 312. For example, the touch screen 312 may be displaying icons of user input shortcuts all related to audio, e.g. volume, bass, treble, and fade. After the user presses the activation button 318, the VUI controller 326, may replace the displayed icons, with icons of user input shortcuts relating to the climate system, e.g. temperature, fan speed, and fan zones. It should be understood, that the mappings of the user input shortcuts 314 would also need to be updated, such that the user may press the shortcut relating to the fan speed and actually increase or decrease the fan speed, rather than the treble. The activation button 318 may also be used for other functions, such as activating or deactivating the VUI system 300.

Also, in some embodiments, the VUI system 300 may include a display unit 320. The display unit 320 can be installed on the dashboard in the line of sight of the driver. It may display the touch control selections and touchpad 316 actions so as to provide visual feedback to the user. The VUI controller 326 communicates display commands to the display unit 320. For example, the display may display a set of user input shortcuts. Once the user selects the desired user input shortcut, the VUI controller 326 may send a command to display the icon, as well as a value relating to the shortcut. As the user swipes the touchpad 316, the VUI controller 326 will communicate a command to the display device 320 to visually indicate the increase or decrease in the value of the control value. In some embodiments, the display device 320 may fold up and retract into the dashboard of the vehicle when it is not in use.

Also depicted in FIG. 3 are an accelerometer 322 and a gyroscopic sensor 324. These inertial sensors may be embedded in the steering wheel 10, or may be located in other portions of the vehicle. When the accelerometer 322 or gyroscopic sensor 324 sense changes in velocity, acceleration, or orientation the sensors will communicate a signal to the VUI controller 326 indicating an amount of change in motion. When the changes in velocity, acceleration, or orientation exceed a threshold, the VUI system 300 may be deactivated until this value no longer exceeds the threshold. This prevents the user from entering unintended input. When the VUI system 300 is deactivating, the VUI controller 326 can store all the current settings to the VUI storage module 328.

As may be appreciated from the disclosure, the VUI system 300 may be activated and deactivated, either by the user or by the VUI controller 326. The VUI system 300 may have three operational states, an active state, a deactivated state, and a power save state. The VUI system may go into a power save state when the controls have not been used for a predetermined amount of time. In some embodiments, the user may switch from power mode state to the active state by touching the touch screen 312, touchpad 316, or the activation button 318. When the VUI system 300 returns to an active state, the display unit may display the previously selected user icon and its associated control value. This may be accomplished if the VUI controller 326 stores the status of the system 300 before switching states. The following table provides an example of the statuses of the various input and output devices in the various states.

| STATES | ON | OFF | Display Popped Up or Folded |
|---|---|---|---|
| Deactivated | | Touch Controls, Touch Pad, VUI Controller, Display Device, Touch Control Light, Touch Pad Light | Folded |
| Activated | Touch Controls, Touch Pad, VUI Controller, Display Device, Touch Control Light, Touch Pad Light | | Popped Up |
| Power Save | Touch Controls, Touch Pad, VUI Controller | Display Device, Touch Control Light, Touch Pad Light | Popped Up |

It should be appreciated that the VUI control system 300 may operate in other states as well.

FIG. 8 depicts an exemplary method for determining an operational state of the VUI system 300. At step 810, the activation button is pressed. At step 812 the VUI controller is turned on, the display is unfolded and pops up to the user. Also, the touch screen and touchpad are activated. At step 814, the VUI controller monitors the touch screen and touchpad, as well as the activation button and the inertial sensors. At step 816, the VUI controller determines that an event has occurred, such as contact with the touch screen or activation button. At step 817, the VUI controller determines whether the event exceeds a threshold value. An event such as a sharp turn of the steering wheel may trigger the inertial sensors, but may not do so to trigger a transmission of the VUI system's operational state. In this case, the method steps back to step 814. If, however, the event does exceed the threshold, the method steps to 818. At steps 818-822, the VUI controller 826 determines the source of event. If the accelerometer or gyroscopic sensor generated the signal, the method steps to 824. At 824, the touch screen 312 and touchpad 316 back lights are turned off and the VUI controller 326 deactivates the VUI system 300. The method then steps back to step 814. If the VUI controller 326 determines that the event was triggered by the touchpad 316 or touch screen 312, the method steps to step 826. At step 826, the VUI controller 326 determines the user's input command, communicates the command to the central controller 332, and updates the display on the display unit 320, if necessary. If the event was triggered by an input mechanism other than the inertial sensors 322 and 324, touchpad 316 or touch screen 312, then steps to step 828, at which point the VUI controller 326 determines whether the activation/deactivation button was pressed. If so, the display unit 320 folds down at step 830 and the method steps to step 824. If the input came from another input mechanism, VUI controller 326 ignores the input and steps back to step 814. If the event is one indicating idleness for a predetermined amount of time, then the method steps to step 832, where the system 300 goes into power save mode, i.e. the lights are turned off, and only the touchpad and touch screen are active. It should be understood that the foregoing is but one way to determine an operational status of the VUI system 300, and is not intended to be limiting.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

It should be understood that the VUI system may have a dedicated processor located at or near the steering wheel. Alternatively, the VUI system may utilize the processor of the central console.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A reconfigurable vehicle user interface system comprising:
    a steering wheel;
    a touch screen disposed along an outer surface of the steering wheel that generates a signal upon sensing user contact with a touch-sensitive surface of the touch screen, wherein the signal is dependent on location of the user contact;
    a controller that receives the signal generated by the touch screen and determines a function command from the signal based on the location of the user contact;
    a plurality of input shortcuts displayed on the touch screen, each user input shortcut has a mapping to a specific function command, wherein each user input shortcut displayed on the touch screen indicates to the user the specific function command that is mapped to the user input shortcut; and
    a touch screen reconfiguration module that receives a user configuration specified by the user indicating a configuration of the plurality of user input shortcuts and displays the plurality of user input shortcuts according to the user configuration, wherein the user configuration includes an amount of user input shortcuts to be displayed, locations of each of the user input shortcuts, sizes of each of the user input shortcuts, and the mapping of the location to function command of each of the user input shortcuts,
    the touch screen reconfiguration module and the touch screen defining a plurality of different user selectable screen layouts for configuring the wheel-mounted touch screen, each layout characterized by a predefined number of discrete areas each adapted to accommodate one shortcut,
    the touch screen reconfiguration module being further adapted to allow the user to select among the plurality of different screen layouts by specifying the number of shortcuts desired to be displayed and by further selecting which of the discrete areas of a selected layout shall contain a shortcut.

2. The system of claim 1 further comprising a storage module that stores a plurality of usable user input shortcuts, wherein the user selects the plurality of user input shortcuts from the plurality of usable user input shortcuts.

3. The system of claim 2 further comprising a touchpad, wherein the plurality of the user input shortcuts are flexibly displayed on the touchpad.

4. The system of claim 2 further comprising a user configuration database storing a plurality of user configurations for a plurality of users, wherein the touch screen configuration module displays the plurality of user interface shortcuts according to the user of the plurality of users that is driving the vehicle.

5. The system of claim 1 further comprising a touchpad disposed on the surface of the steering wheel for entering user input, wherein the user selects a function command using the touch screen and manipulates a setting of a device corresponding to the function command using the touchpad.

6. The system of claim 1 further comprising a display unit that displays to the user device settings after the user contacts the user input function associated with the device.

7. The system of claim 1 further comprising an inertial sensor that generates a signal indicating an amount of change in motion of the vehicle and communicates the signal to the controller, wherein the controller deactivates the vehicle user interface system when the signal exceeds a predetermined threshold.

8. The system of claim 2 wherein the controller receives user input shortcuts for a new device and stores said user input shortcuts in the storage module thereby integrating the new device with the vehicle user interface system.

9. The system of claim 1 wherein the touch screen provides a user with at least one of haptic, tactile, visual, or audio response when contacted by the user.

10. A reconfigurable vehicle user interface system comprising:
   a steering wheel;
   a touchpad disposed on the steering wheel;
   a display for displaying a user input shortcut; and
   a controller for controlling displaying the user input shortcut,
   wherein the controller changes displaying the user input shortcut according to an operation on the touchpad,
   the controller having a touch screen reconfiguration module,
   the touch screen reconfiguration module and the touch screen defining a plurality of different user selectable screen layouts for configuring the wheel-mounted touch screen, each layout characterized by a predefined number of discrete areas each adapted to accommodate one shortcut,
   the touch screen reconfiguration module being further adapted to allow the user to select among the plurality of different screen layouts by specifying the number of shortcuts desired to be displayed and by further selecting which of the discrete areas of a selected layout shall contain a shortcut.

11. The system of claim 10 wherein the touchpad is disposed on two sides, right and left, of the steering wheel, the user input shortcut is displayed on at least two sides, right and left, of the display, the controller changes a setting of the right user input shortcut according to an operation on the right touchpad, and the controller changes a setting of the left user input shortcut according to an operation on the left touchpad.

* * * * *